United States Patent
Ogawa

(10) Patent No.: US 7,657,430 B2
(45) Date of Patent: Feb. 2, 2010

(54) SPEECH PROCESSING APPARATUS, SPEECH PROCESSING METHOD, PROGRAM, AND RECORDING MEDIUM

(75) Inventor: Hiroaki Ogawa, Chiba (JP)

(73) Assignee: Sony Corporation, Tokyo (JP)

( * ) Notice: Subject to any disclaimer, the term of this patent is extended or adjusted under 35 U.S.C. 154(b) by 457 days.

(21) Appl. No.: 11/185,182

(22) Filed: Jul. 20, 2005

(65) Prior Publication Data

US 2006/0020461 A1      Jan. 26, 2006

(30) Foreign Application Priority Data

Jul. 22, 2004   (JP)   ............... 2004-213893

(51) Int. Cl.
*G01L 17/00* (2006.01)
(52) U.S. Cl. ............... 704/243; 704/244
(58) Field of Classification Search ......... 704/251–252, 704/255, 257, 243–244
See application file for complete search history.

(56) References Cited

U.S. PATENT DOCUMENTS

| | | | | |
|---|---|---|---|---|
| 4,481,593 A | * | 11/1984 | Bahler | 704/253 |
| 5,029,211 A | * | 7/1991 | Ozawa | 704/266 |
| 5,131,043 A | * | 7/1992 | Fujii et al. | 704/254 |
| 5,359,514 A | * | 10/1994 | Manthuruthil et al. | 704/10 |
| 5,386,492 A | * | 1/1995 | Wilson et al. | 704/252 |
| 5,454,062 A | * | 9/1995 | La Rue | 704/254 |
| 5,748,840 A | * | 5/1998 | La Rue | 704/254 |
| 5,793,891 A | * | 8/1998 | Takahashi et al. | 382/228 |
| 5,797,116 A | * | 8/1998 | Yamada et al. | 704/10 |
| 6,070,140 A | * | 5/2000 | Tran | 704/275 |
| 6,374,210 B1 | * | 4/2002 | Chu | 704/9 |
| 6,502,072 B2 | * | 12/2002 | Jiang et al. | 704/255 |
| 6,571,210 B2 | * | 5/2003 | Hon et al. | 704/251 |
| 6,662,159 B2 | * | 12/2003 | Komori et al. | 704/255 |
| 6,961,701 B2 | * | 11/2005 | Ogawa et al. | 704/236 |
| 6,990,449 B2 | * | 1/2006 | Case | 704/260 |
| 7,092,567 B2 | * | 8/2006 | Ma et al. | 382/177 |
| 2002/0173958 A1 | * | 11/2002 | Asano et al. | 704/251 |

(Continued)

FOREIGN PATENT DOCUMENTS

JP        2001 92485        4/2001

OTHER PUBLICATIONS

T. J. Hazen and I. Bazzi ("A comparison and combination of methods for OOV word detection and word confidence scoring". In Proceedings of the International Conference on Acoustics IC, vol. 1, pp. 397-400, May 2001).*

(Continued)

*Primary Examiner*—Richemond Dorvil
*Assistant Examiner*—Eric Yen
(74) *Attorney, Agent, or Firm*—Frommer Lawrence & Haug LLP; William S. Frommer; Thomas F. Presson

(57) ABSTRACT

An apparatus inputs an utterance and performs speech recognition on the input utterance. The speech processing apparatus determines whether the recognition result contains an unknown word. If it is determined that the recognition result contains an unknown word, it is then determined whether the recognition result is rejected or not. If it is determined that the recognition result is not rejected, a word corresponding to the unknown word contained in the recognition result is required. The apparatus can be used as a speech processing apparatus.

16 Claims, 23 Drawing Sheets

U.S. PATENT DOCUMENTS

2002/0178005 A1* 11/2002 Dusan et al. ................ 704/254

OTHER PUBLICATIONS

Sheryl R. Young, "Learning New Words from Spontaneous Speech: A Project Summary", CMU, 1993.*

Tetsuji Nakagawa, Taku Kudoh, Yuji Matsumoto "Unknown Word Guessing and Part-of-Speech Tagging Using Support Vector Machines", In Proceedings of the Sixth Natural Language Processing Pacific Rim Symposium, 2001.*

* cited by examiner

FIG. 1
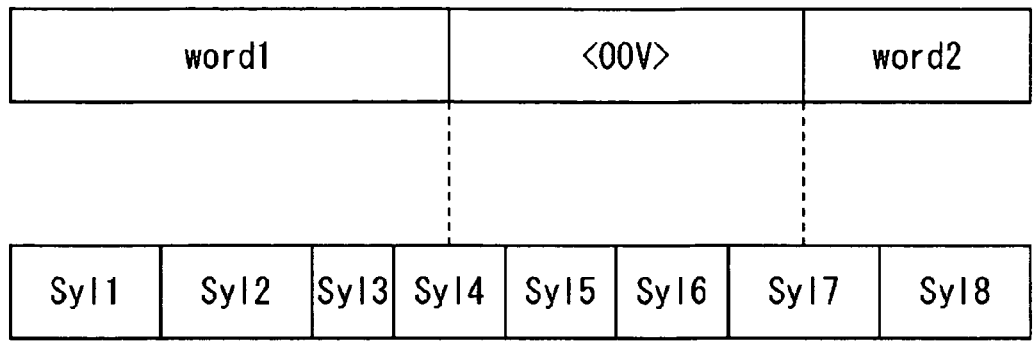
FIG. 2
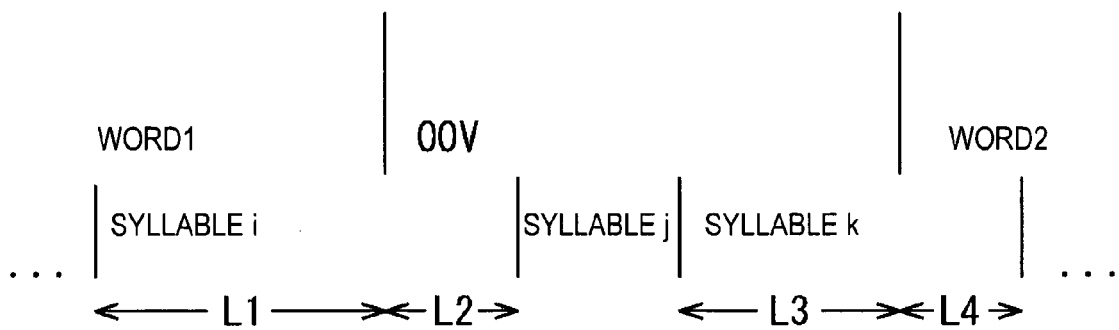
FIG. 3
| RECOGNITION ACCURACY | 40.2 |
|---|---|
| SUBSTITUTION ERROR | 22.4 |
| DELETION ERROR | 33.3 |
| INSERTION ERROR | 4.1 |

FIG. 4

| FEATURES | ·16-BIT AND 16-KHz SAMPLING |
| --- | --- |
| | ·FRAME PERIOD 10 MSEC |
| | ·FRAME LENGTH 25 MSEC |
| | ·12TH-ORDER MFCC, FIRST-ORDER REGRESSION COEFFICIENT OF 0 TO 12TH-ORDER MFCC (25 DIMENSIONS) |
| ACOUSTIC MODEL | ·16 MIXTURE, 1000 TIED-STATE HMM |
| LANGUAGE MODEL | ·SUB-WORD TRIGRAM |
| | ·CUT-OFF TRIGRAM 5, BIGRAM 5 |

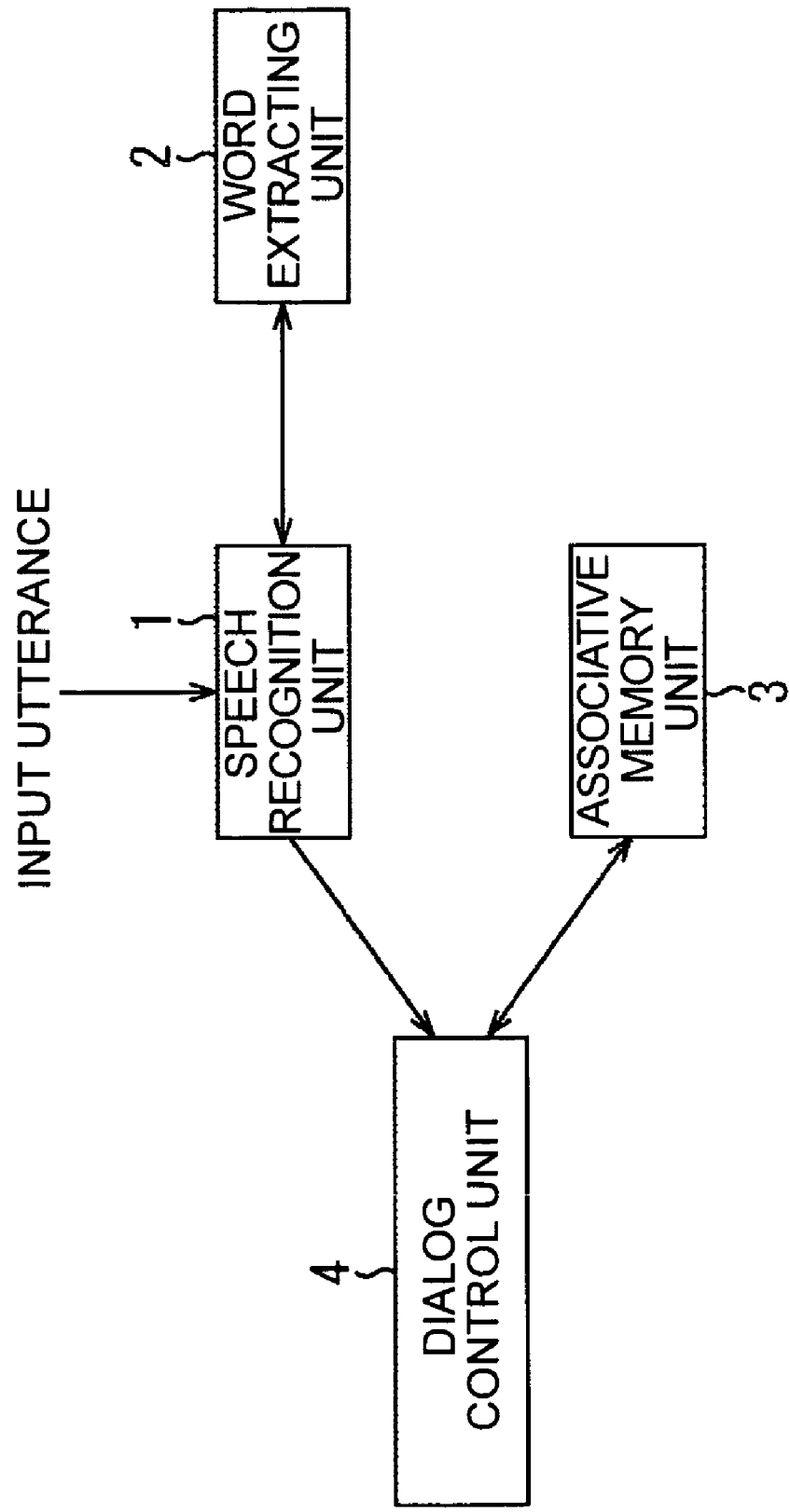

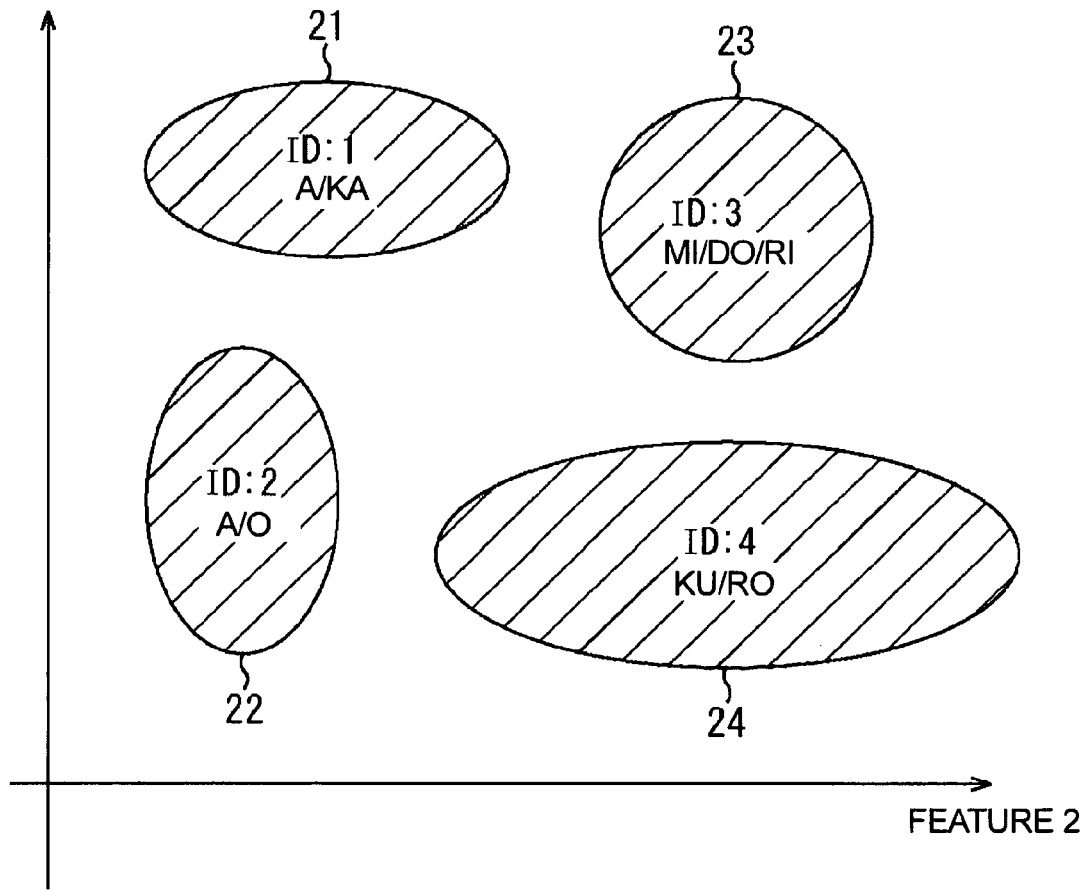

FIG. 12

```
$USER_NAME_ACQUISITION = (WATASHI | BOKU)[NO NAMAE] WA <OOV>[DESU];
$CHARACTER_NAME_ACQUISITION = KIMI [NO NAMAE] WA <OOV>[DAYO];
$OTHER = KONNICHIWA | SAYOUNARA | <OOV>$ACTION SHITE;
$UTTERANCE         =         $USER_NAME_ACQUISITION
$CHARACTER_NAME_ACQUISITION | $OTHER ;
(<START> $UTTERANCE <END>)
...
```

FIG. 14 score(<START> WATASHI NO NAMAE WA <OOV> DESU <END>)
= P(<START> WATASHI NO NAMAE WA <OOV> DESU <END>)

= P(<START>)P(WATASHI | <START>)P(NO | <START> WATASHI)P(NAMAE | <START> WATASHI NO)
P(WA | <START> WATASHI NO NAMAE)P(<OOV> | <START> WATASHI NO NAMAE WA)
P(DESU | <START> WATASHI NO NAMAE WA <OOV>)
P(<END> | <START> WATASHI NO NAMAE WA <OOV> DESU)

≈ P(<START>)P(WATASHI | <START>)P(NO | <START> WATASHI)P(NAMAE | WATASHI NO)
P(WA | NO NAMAE)P(<OOV> | NAMAE WA)P(DESU | WA <OOV>)
P(<END> | <OOV> DESU)

| w1 | w2 | w3 | P(w3 \| w1 w2) |
|---|---|---|---|
| <START> | WATASHI | NO | 0.12 |
| WATASHI | NO | NAMAE | 0.01 |
| NO | NAMAE | WA | 0.20 |
| NAMAE | WA | <OOV> | 0.10 |
| WA | <OOV> | DESU | 0.44 |
| <OOV> | DESU | <END> | 0.87 |

FIG. 18

| RECOGNITION ACCURACY | 48.5 |
|---|---|
| SUBSTITUTION ERROR | 31.9 |
| DELETION ERROR | 11.6 |
| INSERTION ERROR | 8.0 |

FIG. 19

| CORRECT ANSWER | RECOGNITION RESULT |
|---|---|
| KU RO SA KI | KU RO TA CHI |
| KU RO SA KI | O RO SA |
| KU RO SA KI | RO SA KI |
| KU RO SA KI | RO SA KI |
| KU RO SA KI | KU RO SA KI |
| KA ZU MI | KA ZU MI |
| KA ZU MI | KA TSU NI |
| KA ZU MI | KA ZU MI |
| KA ZU MI | KA TSU MI |
| KA ZU MI | KA SU MI |

FIG. 21

| REGULAR EXPRESSION | OPERATION |
|---|---|
| /KIMI(.)+WA<OOV>/ | REGISTER CLUSTER ID CORRESPONDING TO <OOV> AS ROBOT NAME |
| /(WATASHI \| BOKU)(.)+<OOV>/ | REGISTER CLUSTER ID CORRESPONDING TO <OOV> AS USER NAME |

$SYLLABLE = A | I | U | ... | KA | KI | ... | TA | sp;

$OOV = {$SYLLABLE};

$UTTERANCE = (WATASHI | BOKU)[NO NAMAE] WA $OOV DESU;

(<START> $UTTERANCE <END>)

:

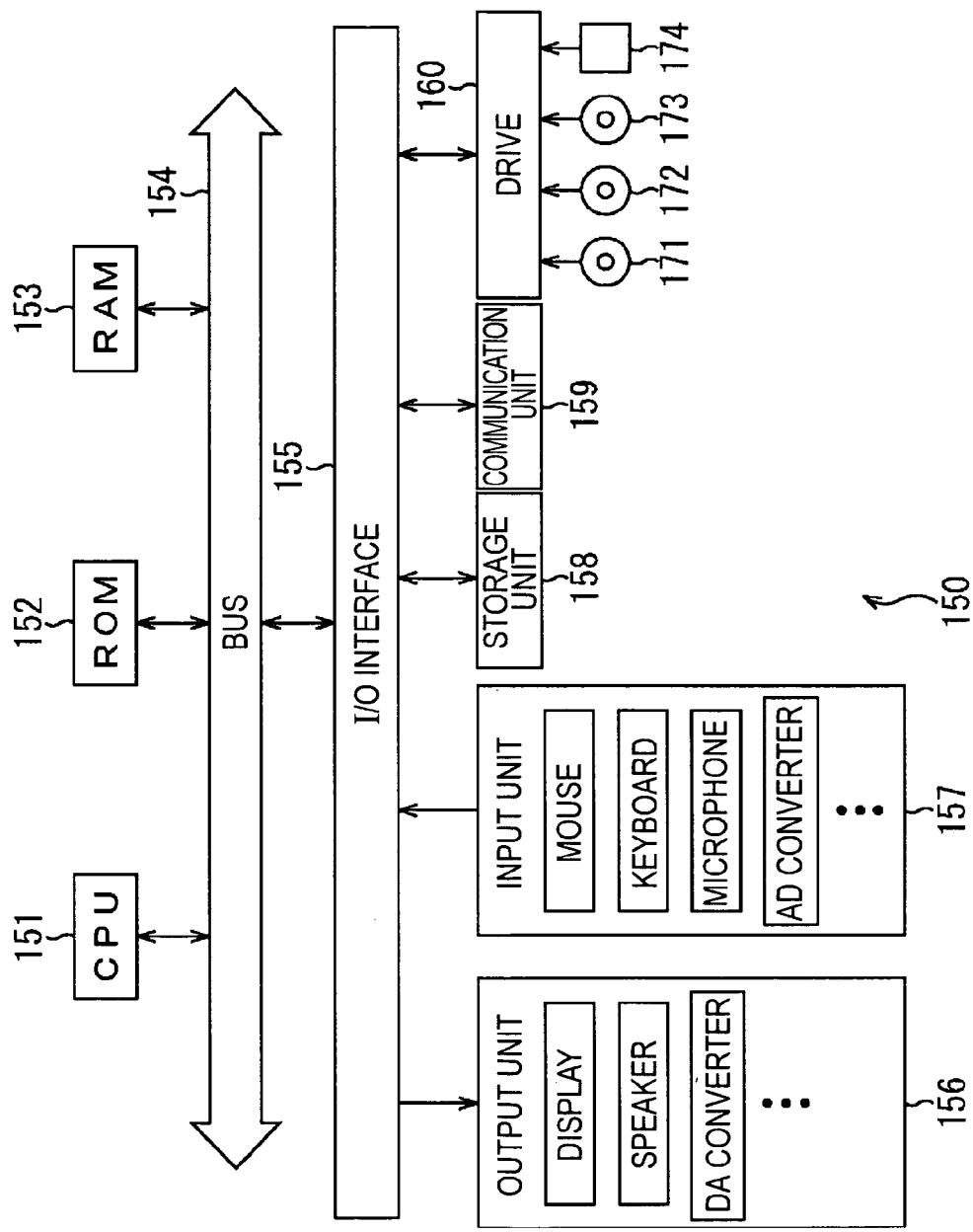

SPEECH PROCESSING APPARATUS, SPEECH PROCESSING METHOD, PROGRAM, AND RECORDING MEDIUM

CROSS REFERENCES TO RELATED APPLICATIONS

The present invention contains subject matter related to Japanese Patent Application JP 2004-213893 filed in the Japanese Patent Office on Jul. 22, 2004, the entire contents of which are incorporated herein by reference.

BACKGROUND OF THE INVENTION

1. Field of the Invention

The present invention relates generally to a speech processing apparatus, a speech processing method, a program, and a recording medium, and, in particular, to a speech processing apparatus, a speech processing method, a program, and a recording medium for preventing an erroneous unknown word from being acquired.

2. Description of the Related Art

To acquire an unknown word in a continuous speech recognition system having a function to acquire a new word, such as a name, that is, an unknown word not contained in a dictionary, the system needs to estimate the duration of the unknown word in the utterance and assign a pronunciation (reading) to the unknown word.

To estimate the duration of the unknown word in the utterance, the system performs speech recognition based on units shorter than a word (sub-word), such as a phoneme, a syllable, and another phonological unit. A sequence of syllables is assigned to the utterance, that is, readings in Japanese Kana are assigned to the utterance so as to acquire a score for each syllable. By appropriately penalizing the scores, a score for an out-of-vocabulary (OOV) word is then estimated. If the score for the OOV word in certain duration is higher than the score of a word contained in a dictionary, the utterance in the duration is recognized as an unknown word. The pronunciation of an unknown word is represented by a sub-word sequence (e.g., a syllable sequence) in the duration of the unknown word (refer to, for example, "Proceedings of International Conference on Spoken Language Processing (ICSLP) 2000" by Issam Bazzi and James R. Glass, October 2000, pp. 433-436, "Comparison of Continuous Speech Recognition Systems with Unknown Word Processing for Speech Disfluencies" by Atsuhiko KAI and Seiichi NAKAGAWA, Journal of the Institute of Electronics, Information and Communication Engineers of Japan, Vol. J80-D-II, pp. 2615-2625, October, 1997, and "Efficient Decoding Method for OOV word Recognition with Subword Models" by Hiroaki KOKUBO, Shigehiko ONISHI, Hirofumi YAMAMOTO, and Genichiro KIKUI, Journal of the Information Processing Society of Japan, Vol. 43, No. 7, pp. 2082-2090, July, 2002).

Unfortunately, when performing a speech recognition process based on a unit of syllable to estimate the duration of an unknown word, the boundary between words does not necessarily match the boundary between syllables.

Such a mismatch between word and syllable boundaries, that is, a mismatch between boundaries of a word sequence and a sub-word sequence is described next with reference to FIG. 1.

For example, as shown in FIG. 1, when the result of the word speech recognition is "word1"<OOV>"word2", in terms of boundaries between <OOV> and the adjacent words, the boundaries between the words sometimes do not match the boundaries in the sub-word sequence (i.e., sub-word sequence Sy11 to Sy18). As used herein, <OOV> is a symbol representing an unknown word. "word1" and "word2" are words contained in a dictionary (i.e., known words).

In the example shown in FIG. 1, the earlier boundary of <OOV> temporally corresponds to the halfway point of Sy14, and the later boundary of <OOV> temporally corresponds to the halfway point of Sy17. Accordingly, the subwords Sy14 and Sy17, which correspond to the mismatched boundaries, are sometimes included in <OOV> and are sometimes excluded from <OOV>. To acquire the pronunciation of <OOV>, it is desirable that the boundaries of the sub-words be determined.

A method for acquiring the pronunciation of <OOV> by determining the boundaries of a sub-word (i.e., the boundaries of duration of an unknown word) is known as the method for acquiring the pronunciation of <OOV> by use of sub-word sequences.

The method for acquiring the pronunciation of <OOV> by use of sub-word sequences is described next with reference to FIG. 2.

In the method for acquiring the pronunciation of <OOV> by use of sub-word sequences, if 50% or more of the duration of a syllable containing either boundary of <OOV> is contained in <OOV>, the syllable is considered to be part of <OOV>.

For example, as shown in FIG. 2, part of a normally recognized word sequence is "word1", <OOV>, and "word2". Part of a sub-word sequence from a phonetic typewriter is syllable i, syllable j, syllable k. In this case, since L1 > L2, where L1 is the time duration of syllable i corresponding to word1 and L2 is the time duration of syllable i corresponding to <OOV>, it is determined that syllable i is not included in <OOV>. On the other hand, when considering a duration L3+L4 of syllable k containing a temporally later boundary of OOV>, since L3 > L4, where L3 is the time duration of syllable k corresponding to <OOV> and L4 is the time duration of syllable k corresponding to word2, it is determined that syllable k is included in <OOV>.

FIG. 3 shows an experimental result of the method for acquiring the pronunciation of <OOV> by use of sub-word sequences shown in FIG. 2.

An experiment by the method for acquiring the pronunciation of <OOV> by use of sub-word sequences shown in FIG. 2 was performed for 752 types of utterances of 12 people (6: male, 6: female) in a travel application, including utterances for hotel check-in and ordering at a restaurant. The conditions of feature parameters, an acoustic model, and a language model were set as shown in the FIG. 4. The feature parameters were set to 16-bit and 16-KHz speech sampling, a 10-msec frame period, a 25-msec frame length, 12th-order Mel Frequency Cepstrum Coefficients (MFCC), and first-order regression coefficient of 0 to 12th-order MFCC (25 dimensions). The acoustic model was a 16-mixture and 1000 tied-state Hidden Markov Model (HMM). The language model was a sub-word trigram, Cut-off trigram 5, and biagram 5. In this experiment, 314 types of syllables and syllable chains were used as sub-words. The language model used was a phoneme trigram trained with a corpus from six years of NIKKEI Shimbun (Nihon Keizai Shimbun) articles.

FIG. 3 shows recognition accuracy, substitution error, deletion error, and insertion error of sub-word sequences in percent when acquiring the pronunciation of <OOV> using the method for acquiring the pronunciation of <OOV> by use of sub-word sequences shown in FIG. 2. As used herein, the term "substitution error" refers to an error wherein a correct syllable is substituted by another syllable, the term "deletion error" refers to an error wherein a syllable to be recognized is not recognized at all, and the term "insertion error" refers to an error wherein a syllable not to be recognized appears in the recognition result. The recognition accuracy Acc is determined by the total number of syllables N, the number of correct answers N_C, and the number of insertion errors N_I according to the following equation: Acc=(N_C−N_I)/N.

As shown in FIG. 3, in the method for acquiring the pronunciation of <OOV> by use of sub-word sequences shown in FIG. 2, the recognition accuracy was 40.2%. The substitution error rate, deletion error rate, and insertion error rate were 22.4%, 33.3%, and 4.1%, respectively.

SUMMARY OF THE INVENTION

In the method for acquiring the pronunciation of <OOV> by use of sub-word sequences shown in FIG. 2, if 50% or more of the duration of a syllable corresponding to either boundary of <OOV> is contained in <OOV>, the syllable is considered to be part of <OOV>. Accordingly, if one or more syllables in the duration of an unknown word are erroneously estimated, it is difficult to correct the error of the syllables, and therefore, an erroneous unknown word is acquired. Consequently, for example, if it is considered that the duration of an unknown word has been highly erroneously estimated or is likely to be highly erroneously estimated, the result of the speech recognition should not be used for acquiring an unknown word.

Accordingly, there is a need for a speech processing apparatus, a speech processing method, a program, and a recording medium that prevent an erroneous unknown word from being acquired.

According to an embodiment of the present invention, a speech processing apparatus processes an input utterance and registers a word contained in the input utterance on the basis of the processing result. The speech processing apparatus includes recognition means for recognizing the input utterance, unknown word determination means for determining whether the recognition result of the input utterance obtained by the recognition means contains an unknown word, recognition result rejection means for determining whether the recognition result determined by the unknown word determination means to contain an unknown word is rejected or not, and word extracting means for acquiring a word corresponding to the unknown word contained in the recognition result determined not to be rejected by the recognition result rejection means.

According to an embodiment of the present invention, a speech processing method processes an input utterance and registers a word contained in the input utterance on the basis of the processing result. The speech processing method includes the steps of (a) recognizing the input utterance, (b) determining whether the recognition result of the input utterance obtained by the step of recognizing the input utterance contains an unknown word, (c) determining whether the recognition result determined at step (b) to contain an unknown word is rejected or not, and (d) acquiring a word corresponding to the unknown word contained in the recognition result determined not to be rejected by step (c).

According to an embodiment of the present invention, a computer-readable recording medium stores a program that processes an input utterance and registers a word contained in the input utterance on the basis of the processing result. The program includes the steps of (a) recognizing the input utterance, (b) determining whether the recognition result of the input utterance obtained by the step of recognizing the input utterance contains an unknown word, (c) determining whether the recognition result determined at step (b) to contain an unknown word is rejected or not, and (d) acquiring a word corresponding to the unknown word contained in the recognition result determined not to be rejected by step (c).

According to an embodiment of the present invention, a program processes an input utterance and registers a word contained in the input utterance on the basis of the processing result. The program includes program code for causing a computer to execute the steps of (a) recognizing the input utterance, (b) determining whether the recognition result of the input utterance obtained by the step of recognizing the input utterance contains an unknown word, (c) determining whether the recognition result determined at step (b) to contain an unknown word is rejected or not, and (d) acquiring a word corresponding to the unknown word contained in the recognition result determined not to be rejected by step (c).

As described above, according to the present invention, the acquisition of an erroneous unknown word can be prevented.

BRIEF DESCRIPTION OF THE DRAWINGS

FIG. 1 is a diagram illustrating a mismatch between word and syllable boundaries;

FIG. 2 is a diagram illustrating a method for acquiring the pronunciation of <OOV> by use of sub-word sequences;

FIG. 3 shows an experimental result of the method for acquiring the pronunciation of <OOV> by use of sub-word sequences;

FIG. 4 is a diagram illustrating the conditions of the experiment using the method for acquiring the pronunciation of <OOV> by use of sub-word sequences;

FIG. 5 illustrates the configuration of a dialog system according to an embodiment of the present invention;

FIG. 6 is a diagram illustrating a feature space;

FIG. 7 is a diagram illustrating items stored in an associative memory unit 3;

FIG. 12 is a diagram illustrating an example of a language model for a language model database 53;

FIG. 14 is a diagram illustrating an example in which a language score is computed using a tri-gram;

FIG. 15 is a diagram illustrating an example of a tri-gram database;

FIG. 18 shows the result of an experiment in which OOV was acquired using a word/syllable network;

FIG. 19 shows the result of an experiment in which OOV was acquired using a word/syllable network;

FIG. 21 is a diagram illustrating an example of a template;

FIG. 22 is a diagram illustrating an example of a grammar including a phonetic typewriter 45;

FIG. 27 is a block diagram illustrating the configuration of a computer according to an embodiment of the present invention.

DESCRIPTION OF THE PREFERRED EMBODIMENTS

Figure 8:
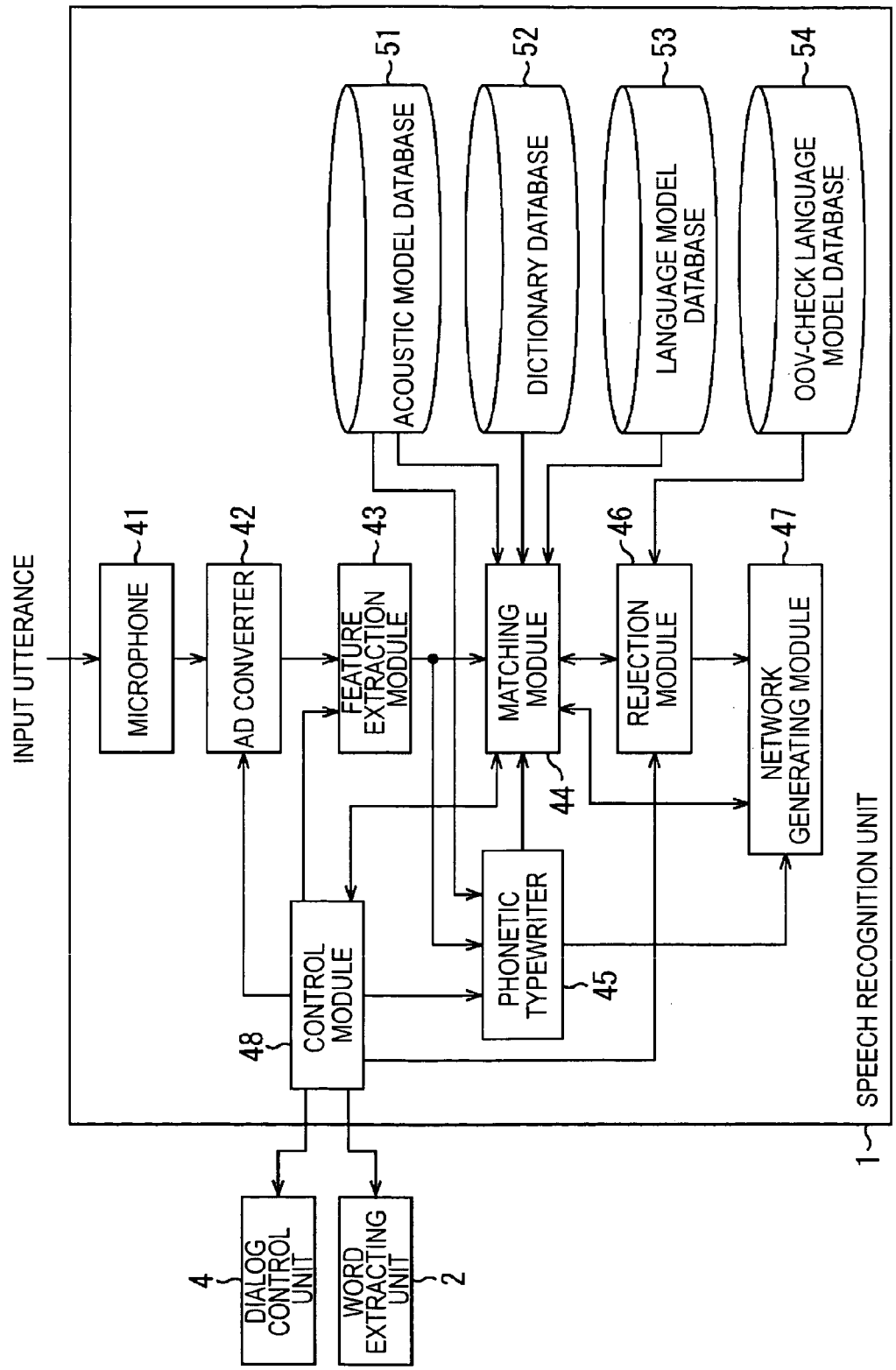
FIG. 8 is a block diagram illustrating the configuration of a speech recognition unit 1.

Embodiments of the present invention are described below with reference to the accompanying drawings.

FIG. 5 illustrates the configuration of a dialog system according to an embodiment of the present invention.

This dialog system can be integrated into, for example, a robot to communicate with a human user via speech. When speech is input, an unknown word, for example, a user name or the name of the robot, is extracted from the speech to be registered.

That is, sound signals that the user utters are input to a speech recognition unit 1. The speech recognition unit 1 recognizes the input sound signals and outputs text and additional information, on the basis of the result of the recognition, to a dialog control unit 4 and a word extracting unit 2 when needed.

The word extracting unit 2 acquires an unknown word, which is not registered in a word dictionary of the speech recognition unit 1, from information output from the speech recognition unit 1. The word extracting unit 2 then automatically memorizes audio features of the word so that the speech recognition unit 1 can subsequently recognize the sound of the word as a known word.

That is, the word extracting unit 2 classifies an unknown word to several clusters formed in a space of features on the basis of the features of the corresponding sound. Each cluster has an ID (identification) and a representative syllable sequence (pronunciation). The clusters are managed on the basis of the ID.

FIG. 6 spacially illustrates the features of sound (a feature space). For the sake of simplicity, the features of sound are shown two-dimensionally in FIG. 6.

For example, three sounds "AKA", "AO", and "MIDORI" are input to the word extracting unit 2. The word extracting unit 2 classifies these three sounds to three corresponding clusters, an "AKA" cluster 21, an "AO" cluster 22, and a "MIDORI" cluster 23, respectively. Concurrently, the word extracting unit 2 assigns representative syllable sequences ("A/KA", "A/O", and "MI/DO/RI" in the case shown in FIG. 6) and IDs ("1", "2", and "3" in the case shown in FIG. 6) to the clusters.

If a sound "AKA" is input again, since a corresponding cluster exists, the word extracting unit 2 classifies the input sound to the "AKA" cluster 21. A new cluster is not created. In contrast, if a sound "KURO" is input, a corresponding cluster does not exist. The word extracting unit 2 creates a "KURO" cluster 24 and assigns a representative syllable sequence ("KU/RO" in the case shown in FIG. 6) and an ID ("4" in the case shown in FIG. 6) to the cluster.

Accordingly, it can be determined whether or not an input sound is an unacquired word (i.e., unknown word) by checking if a new cluster is created. Japanese Patent Application No. 2001-97843 by the present inventor discloses a detailed process for acquiring a word.

Referring back to FIG. 5, an associative memory unit 3 stores information such as a category which identifies whether an unknown word (precisely speaking, a known word which was once an unknown word) is a user name or a robot name. For example, in the case shown in FIG. 7, the associative memory unit 3 stores a pair of items consisting of the cluster ID and the category name. In the example in FIG. 7, the cluster IDs "1", "3", and "4" belong to a "user name" category and the cluster ID "2" belongs to a "robot name" category.

The dialog control unit 4 understands the content of an utterance from the user based on the output of the speech recognition unit 1, and controls the response to the user. The dialog control unit 4 also references the associative memory unit 3 to understand the content of an utterance from the user when needed.

FIG. 8 shows the configuration of the speech recognition unit 1 shown in FIG. 5.

The speech recognition unit 1 includes a microphone 41, an analog-to-digital (AD) converter 42, a feature extraction module 43, a matching module 44, a phonetic typewriter 45, a rejection module 46, a network generating module 47, a control module 48, an acoustic model database 51, a dictionary database 52, a language model database 53, and an OOV-check language model database 54.

An utterance from a user is input to the microphone 41, which converts the utterance to electrical audio signals. The audio signal is supplied to the AD converter 42. The AD converter 42 samples the analog audio signals input from the microphone 41, quantizes, and then converts them to digital audio signals. These digital audio signals are delivered to the feature extraction module 43.

The feature extraction module 43 extracts feature parameters (features), such as a spectrum, power linear predictive coefficients, cepstrum coefficients, and a line spectrum pair, from each frame of the audio data, which is appropriately defined, output from the AD converter 42. The feature parameters are delivered to the matching module 44 and the phonetic typewriter 45.

The matching module 44 performs speech recognition of the utterance (input sound) input to the microphone 41 on the basis of the feature parameters from the feature extraction module 43 while referencing the acoustic model database 51, the dictionary database 52, and the language model database 53 when needed. The matching module 44 then outputs the word sequence obtained by the speech recognition to the rejection module 46 and the control module 48.

The phonetic typewriter 45 further performs speech recognition of the input sound on a syllable basis using the feature parameters supplied from the feature extraction module 43 while referencing the acoustic model database 51, and then outputs the syllable sequence obtained by the speech recognition to both matching module 44 and network generating module 47. For example, from the utterance "WATASHI-NONAMAEWAOGAWADESU", a syllable sequence "WA/TA/SHI/NO/NA/MA/E/WA/O/GA/WA/DE/SU" is obtained. Any commercially available phonetic typewriter can be used as the phonetic typewriter 45.

In place of the phonetic typewriter 45, an apparatus that can acquire a syllable sequence from any utterance may be used. For example, an apparatus that performs speech recognition based on Japanese phonemes (a/i/u/e/o/ka/ki/ . . . ) or speech recognition based on another phonological unit or sub-word, which is a smaller unit than a word, may be used.

The rejection module 46 references the OOV-check language model database 54 to determine whether the rejection module 46 rejects the word sequence obtained as a result of the speech recognition and delivered from the matching module 44. The rejection module 46 then rejects the word sequence or delivers it to the network generating module 47 in accordance with the determination result.

The network generating module 47 generates a word/syllable network, that is, a network of words and syllables on the basis of a word sequence from the rejection module 46 and a syllable sequence from the phonetic typewriter 45. That is, the network generating module 47 generates a word/syllable network including a path containing a syllable at the time corresponding to the earlier boundary of <OOV>, a path not containing this syllable, a path containing a syllable at the time corresponding to the later boundary of <OOV>, and a path not containing this syllable. The word/syllable network is output to the matching module 44.

The control module 48 controls the operations of the AD converter 42, the feature extraction module 43, the matching module 44, the phonetic typewriter 45, and the rejection module 46. The control module 48 also determines whether the result of speech recognition supplied from the matching module 44 contains an unknown word.

The acoustic model database 51 stores an acoustic model representing acoustic features of individual phonemes and syllables of a language for the utterance to be recognized. For example, a Hidden Markov Model (HMM) may be used as an acoustic model. The dictionary database 52 stores a word dictionary describing information about pronunciations and a model describing chains of the phonemes and syllables for the words or phrases to be recognized.

As used herein, the term "word" refers to a unit suitable for the recognition process. It is not necessarily the same as a linguistic word. For example, "TAROUKUN" may be one word, or may be two words in the form of "TAROU" and "KUN". Furthermore, a larger unit "KONNICHIWA-TAROUKUN" may be considered to be one word.

Additionally, the term "syllable" refers to a unit acoustically suitable for the recognition process. It is not necessarily the same as a phonetical syllable. For example, "TOU" in the word "TOUKYOU" may be represented by two syllable symbols "TO/U", or "TO:", which is a prolonged sound of "TO". Furthermore, a symbol representing a silence may be adopted. Still furthermore, symbols that classify the silence as "a silence before an utterance", "a short silence between utterances", "a silence in an utterance", and "a silence corresponding to 'TSU'" may be adopted.

The language model database 53 stores a language model which is linguistic (grammatical) information on how words registered in the dictionary database 52 (i.e., known words) are chained or connected.

The OOV-check language model database 54 stores a language model for checking a sentence including <OOV>.

The process of the dialog system shown in FIG. 5 is described next with reference to a flow chart in FIG. 9.

At step S21, a user inputs an utterance into the microphone 41 of the speech recognition unit 1 (see FIG. 8), which converts the utterance to electrical audio signals and outputs the electrical audio signals. At step S22, the speech recognition unit 1 performs a speech recognition process.

Figure 10:
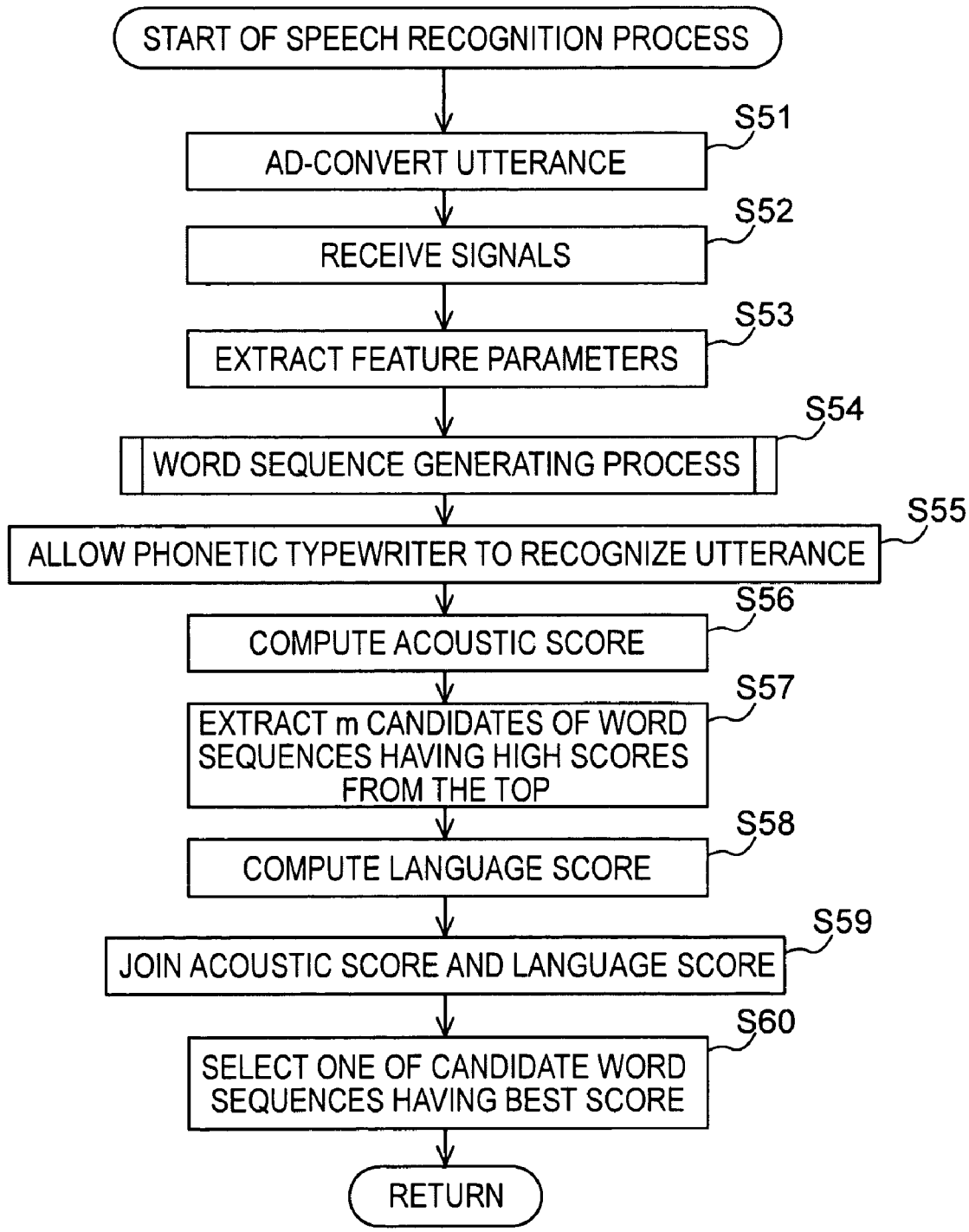
FIG. 10 is a flow chart illustrating the detailed speech recognition process at step S22.

The speech recognition process is described in detail with reference to FIG. 10. At step S51, the AD converter 42 converts the audio signals output from the microphone 41 to digital audio signals, and delivers them to the feature extraction module 43.

At step S52, the feature extraction module 43 receives the audio signals from the AD converter 42. Subsequently, the process proceeds to step S53, where the feature extraction module 43 extracts, from the audio signals, feature parameters of each appropriate frame, such as spectrum, power, and their time variations, and delivers them to the matching module 44 and the phonetic typewriter 45.

Figure 11:
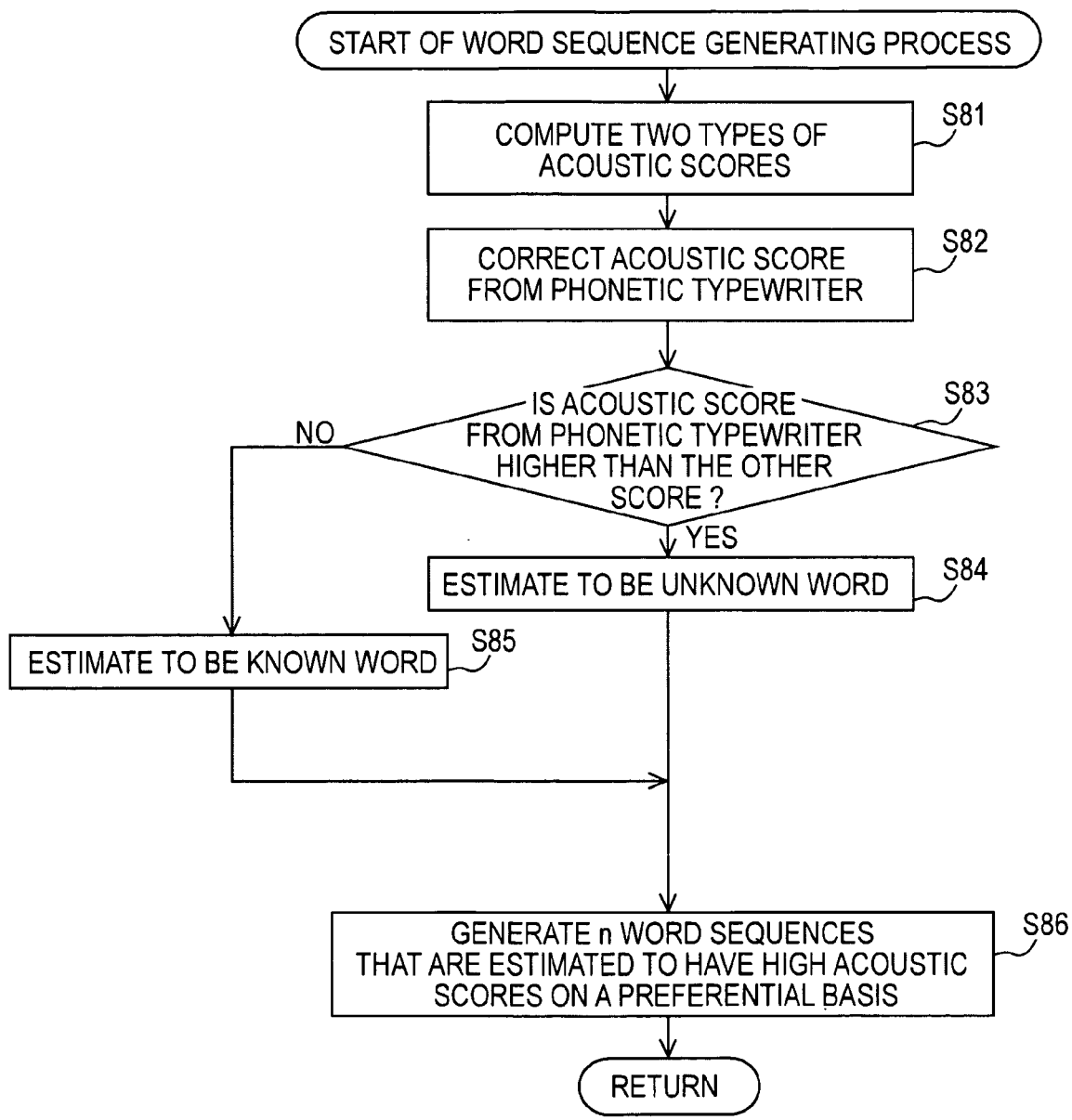
FIG. 11 is a flow chart illustrating the detailed word sequence generating process at step S54.

At step S54, the matching module 44 and the phonetic typewriter 45 perform a word sequence generation process to generate a word sequence to be speech-recognized. The word sequence to be speech-recognized contains "<OOV>", which is a symbol of an unknown word, as well as known words registered in the dictionary database 52. The word sequence generating process is described in detail next with reference to FIG. 11.

At step S81, the matching module 44 and the phonetic typewriter 45 calculate two types of acoustic scores for some time duration of the input utterance: an acoustic score when assuming that the utterance for the duration is a known word and an acoustic score when assuming that the utterance for the duration is <OOV>. That is, the matching module 44 calculates an acoustic score by matching the duration of the input utterance against known words registered in the dictionary database 52 whereas the phonetic typewriter 45 calculates an acoustic score for the duration. The acoustic score indicates how closely a candidate of a word sequence resulting from the speech recognition resembles the input utterance in terms of sound.

Subsequently, the acoustic score resulting from a matching of part of the input utterance against known words registered in the dictionary database 52 is compared with the acoustic score received from the phonetic typewriter 45. Although the matching against the known words is performed word by word, the matching by the phonetic typewriter 45 is performed syllable by syllable. Since the scales are different, the comparison is difficult. In general, an acoustic score for syllables is higher than that for words. Accordingly, at step S82, the matching module 44 corrects the acoustic score from the phonetic typewriter 45 in order to compare both acoustic scores on the same scale.

For example, the acoustic score from the phonetic typewriter 45 is multiplied by some coefficient, or a predetermined value or a value proportional to a frame length is subtracted from the acoustic score from the phonetic typewriter 45. As can be seen, since this process is relative, the acoustic score from the matching against known words may be corrected. This process is described in detail in, for example, "OOV-Detection in Large Vocabulary System Using Automatically Defined Word-Fragments as Fillers", EUROSPEECH99 Volume 1, Pages 49-52.

At step S83, the matching module 44 compares the two acoustic scores, that is, the acoustic score resulting from the matching against the known words and the acoustic score from the phonetic typewriter 45 (after the correction), to determine which acoustic score is higher. If it is determined at step S83 that the acoustic score from the phonetic typewriter 45 is higher than the other acoustic score, the process proceeds to step S84, where the matching module 44 estimates the duration (i.e., the duration for which the acoustic score is calculated) to be an <OOV> word (i.e., an unknown word).

If, at step S83, it is determined that the acoustic score from the acoustic score obtained by the matching against the known words is higher than the other score, the process proceeds to step S85, where the matching module 44 estimates the duration to be a known word.

That is, for example, when the input utterance is "WATASHINONAMAEWAOGAWADESU", an acoustic score output from the phonetic typewriter 45 for "O/GA/WA" in the utterance is compared with an acoustic score from the matching against the known words. If the acoustic score from the phonetic typewriter 45 for "O/GA/WA" is higher than the acoustic score from the matching against the known words, a word corresponding to the duration "OGAWA" is estimated to be "<OOV> (O/GA/WA)". In contrast, if the acoustic score for a known word (i.e., the acoustic score from the matching against the known words) is higher than that from the phonetic typewriter 45, the known word is estimated to be a word corresponding to the duration "OGAWA".

The entire time duration of an input utterance is divided into sub-durations in several patterns. The processes from step S81 through step S85 are carried out for all of the sub-durations in some of the patterns. The process then proceeds to step S86.

At step S86, to perform speech recognition, the matching module 44 acquires n word sequences that are estimated to have high total acoustic scores on a preferential basis from among word sequences, each of which corresponds to the entire duration of the input utterance and each of which is a concatenation of words for the sub-durations estimated at step S84 or step S85.

Referring back to FIG. 10, at step S55, the phonetic typewriter 45 recognizes the feature parameters extracted by the feature extraction module 43 in the process of step S53 on a phoneme basis independently from the process of step S54, and outputs the acquired syllable sequence to the matching module 44. For example, when an utterance "WATASHI-NONAMAEWAOGAWADESU", where "OGAWA" is an unknown word, is input to the phonetic typewriter 45, the phonetic typewriter 45 outputs a syllable sequence "WA/TA/SHI/NO/NA/MA/E/WA/O/GA/WA/DE/SU". At step S55, a syllable sequence may be acquired using the processing result at step S54.

At step S56, the matching module 44 computes an acoustic score for each word sequence acquired at step 54. For a word sequence without <OOV> (unknown word), a known method is adopted, that is, the likelihood of each word sequence (a concatenation of word models) for feature parameters of the utterance is computed. On the other hand, for a word sequence with <OOV>, it is difficult to compute an acoustic score for the sound span corresponding to <OOV> using the known method, since a word model corresponding to <OOV> does not exist beforehand. Therefore, an acoustic score for the sound span is extracted from the recognition result of the phonetic typewriter 45. The acoustic score is corrected to be employed as an acoustic score for <OOV>, which is further integrated to acoustic scores for other known words. The final score is used as a score for the word sequence.

At step S57, the matching module 44 extracts m candidates of word sequences having high scores from the top, where m≦n. At step S58, the matching module 44 computes a language score for each candidate of word sequence with reference to the language model database 53. The language score indicates the appropriateness of the candidate word sequence in terms of language. The method for computing the language score is described next.

In order for the speech recognition unit 1 to recognize unknown words, a language model can support unknown words. An example using a grammar that supports unknown words, or a finite state automaton (FSA), and an example using a tri-gram, which is one of the statistical language models supporting unknown words, are described next.

An example using a grammar is described with reference to FIG. 12. The grammar shown in FIG. 12 is presented in Backus-Naur Form (BNF). In FIG. 12, "$A" represents a variable, "A|B" represents either A or B. "[A]" means that A is optional. "{A}" means that A is repeated zero or more times.

<OOV> is a symbol for an unknown word. Defining <OOV> in the grammar allows a word sequence containing an unknown word to be processed. Although "$ACTION" is not defined in FIG. 12, action names such as "KIRITU" (standing up), "CHAKUSEKI" (sitting down), "OJIGI" (bowing), and "AISATSU" (greeting) are defined.

The matching module 44 assigns a language score to a candidate word sequence by determining whether the candidate word sequence conforms (fits) to the following grammar: "<start>/KONNICHIWA/<end>", "<start>/SAYOUNARA/<end>", and "<start>/WATASHI/NO/NAMAE/WA/<OOV>/DESU/<end>", where "/" represents a separator of words. In FIG. 12, "<start>" and "<end>" are special symbols that represent silences before and after an utterance, respectively.

To compute a language score by using this grammar, a parser (analyzer) is introduced. The parser classifies word sequences to a word sequence group accepted by the grammar and a word sequence group not accepted by the grammar. That is, for example, the matching module 44 gives a language score of 1 to a word sequence that conforms to the grammar shown in FIG. 12 and gives a language score of 0 to a word sequence that does not conform to the grammar.

Consequently, for example, two candidate word sequences "<start>/WATASHI/NO/NAMAE/WA/<OOV> (TA/RO/U)/DESU/<end>" and "<start>/WATASHI/NO/NAMAE/WA/<OOV> (JI/RO/U)/DESU/<end>" are fit to the grammar "<start>/WATASHI/NO/NAMAE/WA/<OOV>/DESU/<end>" shown in FIG. 12. Therefore, for example, a language score of 1 is given to each of the two candidate word sequences.

Additionally, after the grammar is converted to an equivalent finite state automaton (hereinafter referred to as "FSA") or an approximate FSA, the language score for a candidate word sequence may be computed by determining whether or not the FSA can accept the candidate word sequence.

Figure 13:
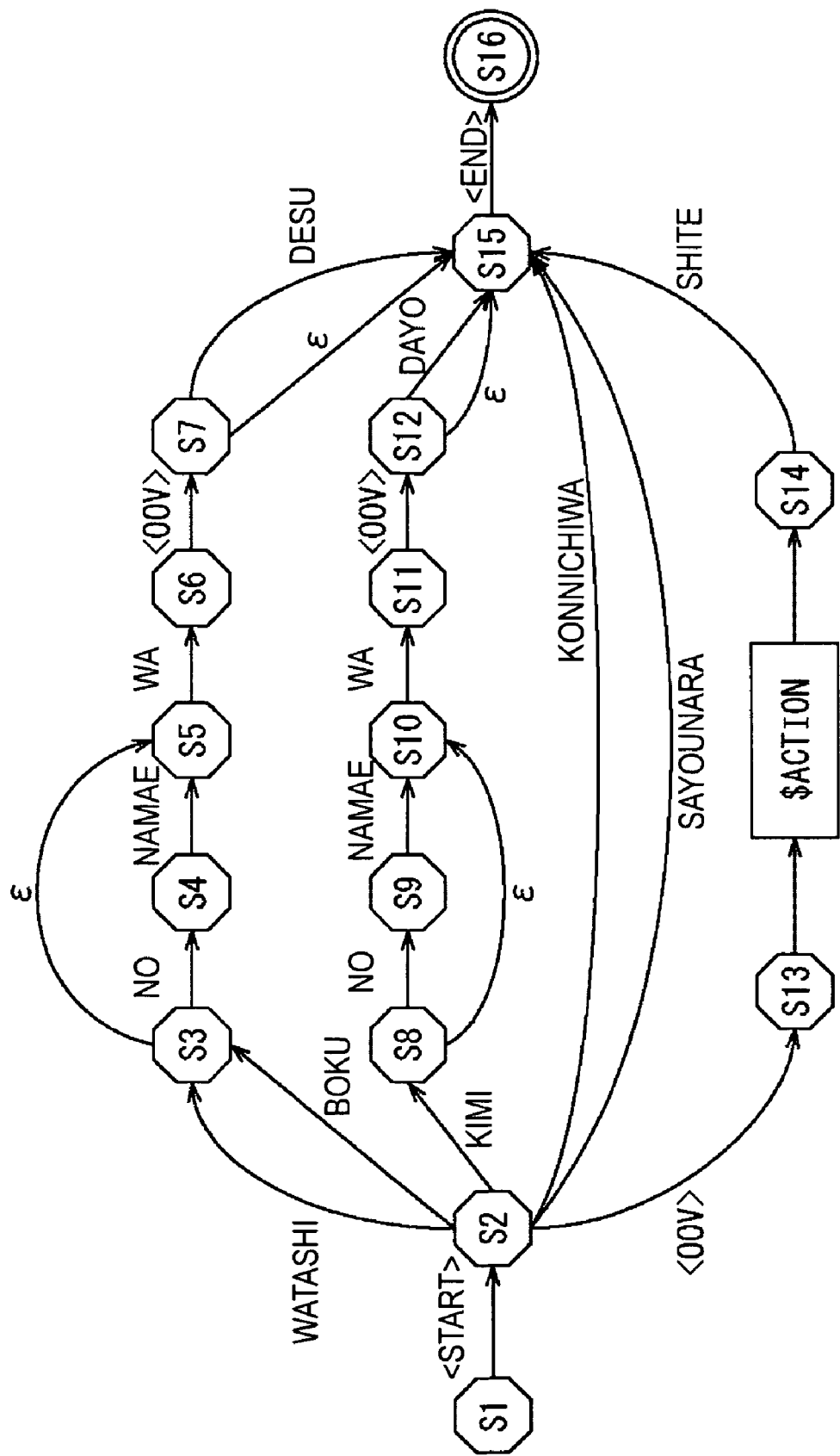
FIG. 13 is a diagram illustrating an example of a language model using a finite state automaton.

FIG. 13 illustrates an example in which the grammar shown in FIG. 12 is converted to an equivalent FSA. An FSA is a directed graph including states (nodes) and paths (arcs). As shown in FIG. 13, S1 represents an initial state and S16 represents a final state. In practice, action names are registered as "$ACTION", as in FIG. 12.

A word is assigned to a path. When a transition from a predetermined state to the next state occurs, a path consumes the word. A path assigned "ε" is a special path that does not consume a word (hereinafter referred to as "ε-transition"). That is, for example, when a transition occurs from an initial state S1 to a state S2, <start> is consumed. When a transition occurs from the state S2 to a state S3, "WATASHI" is consumed. However, since a transition from state S3 to a state S5 is the ε-transition, no word is consumed during the transition. Thus, the transition from the state S3 to the next state S6 can occur after skipping from the state S3 to the state S5.

It is determined whether or not the FSA can accept a given word sequence by determining whether or not the transition can reach the final state S16 after starting from the initial state S1.

That is, for example, when a candidate word sequence is "<start>/WATASHI/NO/NAMAE/WA/<OOV>/DESU/<end>", the word "1<start>" can be consumed by causing a transition from an initial state S1 to a state S2 to occur. The word "WATASHI" can be consumed by causing a transition from the state S2 to a state S3 to occur. In the same manner, "NO", "NAMAE", "WA", and "<OOV>" can be consumed by causing transitions from the state S3 to a state S4, from the state S4 to a state S5, from the state S5 to a state S6, and from the state S6 to a state S7 to sequentially occur. Subsequently, a transition from the state S7 to a state S15 can consume "DESU", and a transition from the state S15 to a state S16 can consume "<end>". Finally, the transition can reach a final state S16. Thus, the candidate word sequence "<start>/WATASHI/NO/NAMAE/WA/<OOV>/DESU/<end>" is accepted by the FSA and a language score of, for example, 1 is given to the candidate word sequence.

For example, if a candidate word sequence is "<start>/KIMI/NO/<OOV>/NAMAE/<end>", transitions from a state S1 to a state S2, from the state S2 to a state S8, and from the state S8 to a state S9 can occur and can consume "<start>", "KIMI", and "NO". However, a subsequent transition cannot occur, and therefore, the next word <OOV> cannot be consumed. That is, the transition cannot reach the final state S16. Thus, "<start>/KIMI/NO/<OOV>/NAMAE/<end>" is not accepted by the FSA and a language score of, for example, 0 is given to the candidate word sequence.

An example in which a language score is computed using a tri-gram, which is one of the statistical language models, is described with reference to FIG. 14. In the statistical language models, a generation probability of the word sequence is found to be the language score. According to the statistical language model, when a candidate word sequence is, for example, "<start>/WATASHI/NO/NAMAE/WA/<OOV>/DESU/<end>", as shown in line 1 in FIG. 14, the language score of the candidate word sequence is represented by a generation probability of the word sequence, as shown in line 2. This is also represented by a product of conditional probabilities shown in lines 3 to 6. Herein, for example, "P(NO|<start> WATASHI)" represents the appearance probability of "NO" under the condition that the immediately preceding word of "NO" is "WATASHI" and the immediately preceding word of "WATASHI" is "<start>".

In the tri-gram, equations shown in the lines 3 to 6 in FIG. 14 are approximated by conditional probabilities of three consecutive words shown in lines 7 to 9. The conditional probability for consecutive words can be obtained by referencing a tri-gram database shown in FIG. 15. The tri-gram database is achieved by analyzing a large amount of text in advance.

In an example shown in FIG. 15, probability P(w3|w1 w2) of three consecutive words w1, w2, and w3 is shown when the three words w1, w2, and w3 appear in this order. For example, when the three words w1, w2, and w3 are "<start>", "WATASHI", and "NO", respectively, the probability P(w3|w1 w2) is 0.12. When the three words w1, w2, and w3 are "WATASHI", "NO", and "NAMAE", respectively, the probability P(w3|w1 w2) is 0.01. When the three words w1, w2, and w3 are "<OOV>", "DESU", and "<end>", respectively, the probability P(w3|w1 w2) is 0.87.

It will be appreciated that "P(W)" and "P(w2|w1) are found in the same manner in advance.

As described above, using the symbol <OOV> for an unknown word in the language model allows a language score for a candidate word sequence including <OOV> to be computed.

Additionally, in the case of other language models, using the symbol <OOV> allows a language score for a candidate word sequence including <OOV> to be computed in the same manner.

Furthermore, in the case of language models without an <OOV> entry, a mechanism that maps <OOV> to an appropriate word in the language model enables a language score for a candidate word sequence including <OOV> to be computed. For example, in a tri-gram that does not have "P(<OOV>|WATASHIWA)" and that has "P(OGAWA|WATASHIWA)", a language score can be computed by mapping <OOV> to "OGAWA" and by considering the value of "P(<OOV>|WATASHIWA)" to be that of "P(OGAWA|WATASHIWA)".

Referring back to FIG. 10, the matching module 44, at step S58, computes the language score of each candidate word sequence. The process then proceeds to step S59, where the matching module 44 joins the acoustic score and the language score for each candidate word sequence. At step S60, the matching module 44 selects one of the candidate word sequences having the best score on the basis of the joined scores of the acoustic scores and the language scores obtained at step S59. The matching module 44 then outputs the candidate word sequence to the rejection module 46 and the control module 48 as the recognition result.

When the grammar shown in FIG. 12 or the finite state automaton shown in FIG. 13 is used as a language model, a candidate word sequence having a language score of zero may be deleted and a candidate word sequence having a language score of non-zero may be left during the joining process at step S59.

Referring back to FIG. 9, after the speech recognition is performed at step S22 as described above, the process proceeds to step S23. At step S23, the control module 48 of the speech recognition unit 1 determines whether or not the recognized word sequence from the matching module 44 includes an unknown word.

If, at step S23, it is determined that an unknown word is included in the recognition result, the process proceeds to step S24. At step S24, the control module 48 controls the rejection module 46 to determine whether the speech recognition result including an unknown word from the matching module 44 is adopted or rejected for acquiring the unknown word. The process then proceeds from step S24 to step S25, where the rejection module 46 determines whether the speech recognition result is rejected or not by referencing the OOV-check language model database 54 under the control of the control module 48.

The process carried out by the rejection module 46 at step S25 is described next with reference to FIG. 16.

Figure 16:
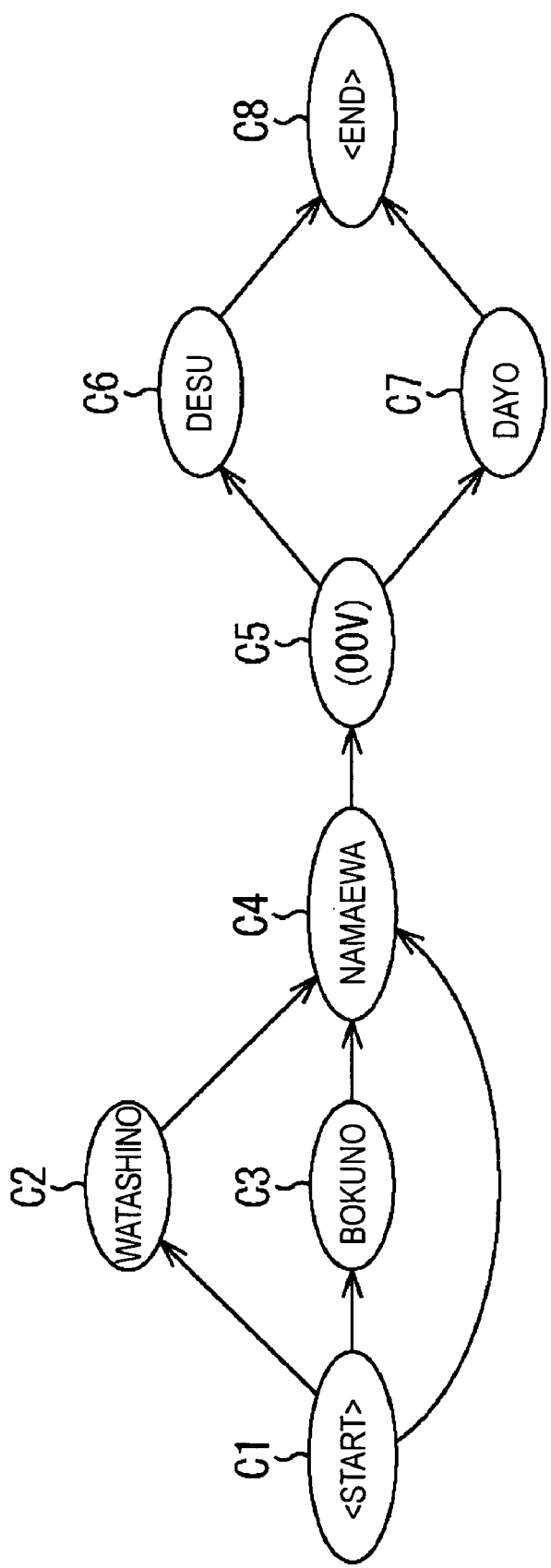
FIG. 16 is a diagram illustrating an example of an OOV-check language model using a finite state automaton.

FIG. 16 illustrates an OOV-check language model stored in the OOV-check language model database 54. The OOV-check language model is a grammar of sentences including an unknown word. In FIG. 16, the grammar is described using a finite state automaton (FSA).

As in the case shown in FIG. 13, the FSA serving as the OOV-check language model shown in FIG. 16 is a directed graph including states (nodes) and paths (arcs).

A word is assigned to a state. When a transition occurs from a predetermined state to the next state, the originating state consumes the word. In FIG. 16, C1 represents an initial state and C8 represents a final state.

The rejection module 46 determines whether to reject a speech recognition result on the basis of whether or not the FSA serving as the OOV-check language model shown in FIG. 16 can accept the speech recognition result.

To determine whether or not the FSA serving as the OOV-check language model can accept the speech recognition result, it is determined whether the state transition starting from the initial state C1 can reach the final state C8 while consuming each word in a word sequence of the speech recognition result.

The OOV-check language model shown in FIG. 16 accepts the following six speech recognition results:
WATASHINO NAMAEWA <OOV> DESU
WATASHINO NAMAEWA <OOV> DAYO
BOKUNO NAMAEWA <OOV> DESU
BOKUNO NAMAEWA <OOV> DAYO

NAMAEWA <OOV> DESU
NAMAEWA <OOV> DAYO.

Figure 9:
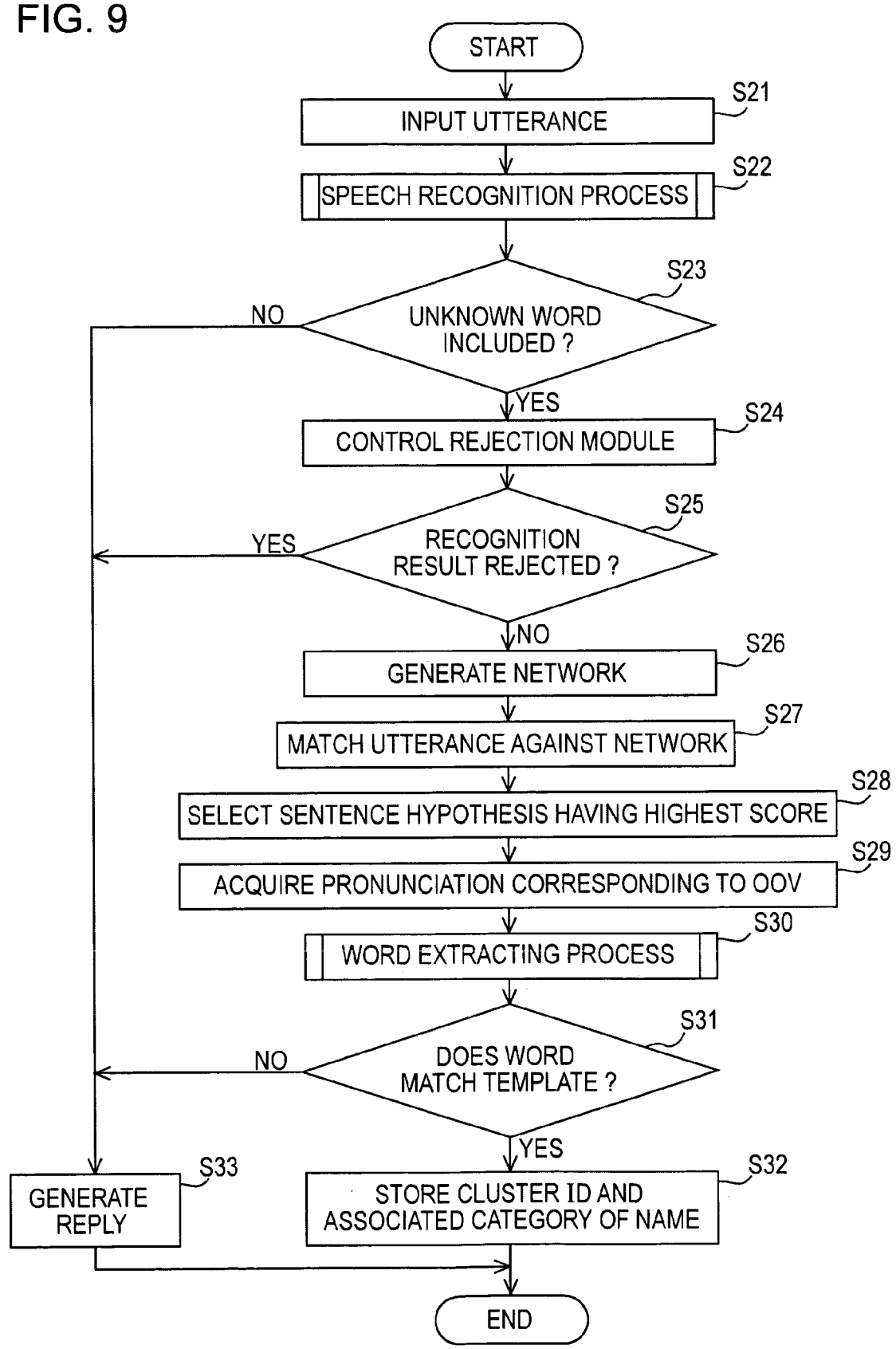
FIG. 9 is a flow chart illustrating the operation of a dialog system.

At step S25 in FIG. 9, the rejection module 46 determines to adopt a speech recognition result supplied from the matching module 44 if the speech recognition result is accepted by the OOV-check language model, whereas the rejection module 46 determines to reject the speech recognition result if the speech recognition result is not accepted by the OOV-check language model.

In addition to this method, the rejection module 46 can determine whether it adopts or rejects a speech recognition result by using, for example, a statistical language model, such as the tri-gram shown in FIGS. 14 and 15. In this case, the rejection module 46 determines to reject a speech recognition result if a language score obtained from the statistical language model is smaller than or equal to (or smaller than) a predetermined threshold value, whereas the rejection module 46 determines to adopt the speech recognition result if the language score is greater than (or equal to) the predetermined threshold value.

Referring back to FIG. 9, if it is determined at step S25 that the rejection module 46 does not reject a speech recognition result and adopts it, the rejection module 46 outputs the speech recognition result to the network generating module 47. The process then proceeds to Step S26.

At step S26, the network generating module 47 generates a word/syllable network on the basis of the speech recognition result from the rejection module 46 and a syllable sequence of the speech recognition result from the phonetic typewriter 45. The network generating module 47 then outputs the word/syllable network to the matching module 44. That is, the network generating module 47 generates a word/syllable network including a path containing a syllable at the time corresponding to a boundary immediately before <OOV>, a path not containing this syllable, a path containing a syllable at the time corresponding to a boundary immediately after <OOV>, and a path not containing this syllable. The word/syllable network is output to the matching module 44.

At step S27, the matching module 44 matches an utterance input from a user against the word/syllable network on the basis of the syllable sequence of the speech recognition result from the phonetic typewriter 45 and the word/syllable network supplied from the network generating module 47.

The generation process of the word/syllable network and the matching process using the word/syllable network are described next with reference to FIG. 17.

Figure 17A:
FIG. 17 is a diagram illustrating the generation of a word/syllable network.

For example, a user inputs the utterance "WATASHI-NONAMAEWAOGAWADESU", where "OGAWA" is an unknown word, to the microphone 41. As shown in FIG. 17A, the matching module 44, for example, acquires the word sequence "<start>/WATASHI/NO/NAMAE/WA/<OOV>/DESU/<end>" as a speech recognition result. Concurrently, as shown in FIG. 17B, the phonetic typewriter 45 outputs the syllable sequence "WA/TA/SHI/NO/NA/MA/E/WA/O/GA/WA/DE/SU" as a speech recognition result.

Figure 17B:
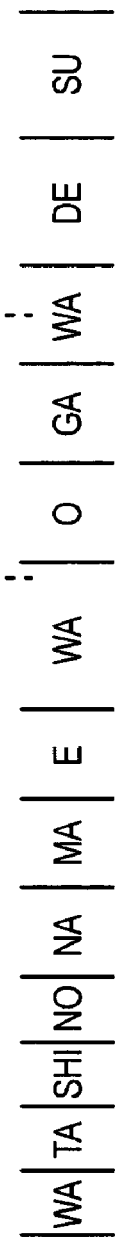

In this case, as shown in FIGS. 17A and 17B, boundaries in the word sequence acquired from the speech recognition result of the matching module 44 do not generally match boundaries in the syllable sequence acquired from the phonetic typewriter 45. For example, in the case of FIGS. 17A and 17B, the boundary between the word "WA" and the word "<OOV>" in the word sequence corresponds to the syllable "WA" in the syllable sequence. The boundary between the word "<OOV>" and the word "DESU" in the word sequence corresponds to the syllable "WA" (the last "WA") in the syllable sequence. That is, when considering the boundary between the word "WA" and the word "<OOV>" in the word sequence, the syllable "WA" in the syllable sequence corresponding to the boundary is included both in the word "WA" and the word "<OOV>" in the word sequence.

To solve this problem, a word/syllable network that includes words in the word sequence of the speech recognition result and syllables in the syllable sequence of the speech recognition result is generated. That is, as shown in FIG. 17C, a word/syllable network is generated which includes a path containing a syllable at the time corresponding to a boundary immediately before <OOV>, a path not containing this syllable, a path containing a syllable at the time corresponding to a boundary immediately after <OOV>, and a path not containing this syllable.

More specifically, for example, a word/syllable network for the word sequence of the speech recognition result "WATASHI/NO/NAMAE/WA/<OOV>/DESU" (<start> and <end> are not shown) is generated by assigning each word of the word sequence to a state and by connecting the states (words) using paths.

The duration between the word "WA" immediately before <OOV> and the word "DESU" immediately after <OOV> corresponds to syllables "WA", "O", "GA", and "WA". In this case, these syllables are assigned to the state, which are connected using paths 92, 93, 94, 102, and 103. Additionally, the state representing the word "WA" immediately before <OOV> bypasses a state representing the syllable "WA" corresponding to the boundary immediately before <OOV> and is connected to a state representing the next syllable "O" using a path 91. Also, the state representing the word "DESU" immediately after <OOV> bypasses a state representing the syllable "WA" corresponding to the boundary immediately after <OOV> and is connected to a state representing the previous syllable "GA" using a path 101.

Figure 17C:
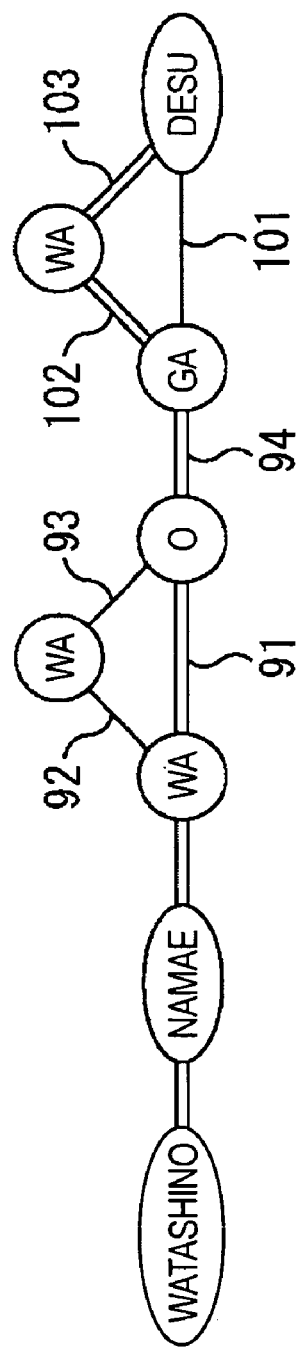

As a result, as shown in FIG. 17C, at the boundary between the word "WA" and the word "<OOV>" in the word sequence, a path 91 that does not contain the syllable "WA" corresponding to the boundary, and paths 92 and 93 that contain the syllable "WA" are generated in the word/syllable network. At the boundary between the word "<OOV>" and the word "DESU" in the word sequence, a path 101 that does not contain the syllable "WA" corresponding to the boundary, paths 102 and 103 that contain the syllable "WA" are generated in the word/syllable network. Accordingly, a sub-word sequence (syllable sequence) corresponding to <OOV> in the word/syllable network for the input utterance can be selected without determining boundaries in the sub-word sequence.

In the word/syllable network shown in FIG. 17C, the duration between the word "WA" immediately before <OOV> and the word "DESU" immediately after <OOV> is composed of the syllables "WA", "O", "GA", and "WA", which are possible syllables corresponding to the pronunciation for <OOV>. Therefore, the word/syllable network can generate the following four sentence hypotheses:

WATASHINO-NAMAE-WA-WA-O-GA-WA-DESU
WATASHINO-NAMAE-WA-WA-O-GA-DESU
WATASHINO-NAMAE-WA-O-GA-WA-DESU
WATASHINO-NAMAE-WA-O-GA-DESU

As shown in FIG. 9, at step S27, the matching module 44 matches each of the sentence hypotheses against the utterance input from the user (i.e., the input utterance for which the sentence hypotheses are generated). The process then proceeds to step S28, where the matching module 44, for example, selects the sentence hypothesis having the highest acoustic score on the basis of the result of matching between the utterance input from a user and the sentence hypotheses. The process then proceeds to step S29. At step S29, the matching module 44 acquires a pronunciation corresponding to <OOV> on the basis of the sentence hypothesis selected at step S28. That is, if, for example, "WATASHINO-NAMAE-WA-O-GA-WA-DESU" is selected from among the four sentence hypotheses at step S28, "OGAWA" is acquired as a pronunciation for <OOV> at step S29.

FIGS. 18 and 19 show the result of an experiment to acquire <OOV> using the above-described method. The conditions of the experiment are identical to those in FIG. 4, and therefore, those descriptions are not repeated.

FIG. 18 shows the recognition accuracy of a syllable sequence of <OOV>, substitution error rate, deletion error rate, and insertion error rate in percent. The detailed description for each item is identical to that in FIG. 3, and therefore, its description is not repeated. As can be seen from the experimental result in FIG. 18, the recognition accuracy was 48.5%, which is improved compared to that of 40.2% by the <OOV> pronunciation acquiring method by use of a sub-word sequence shown in FIG. 3. The appearance probabilities of deletion error and insertion error are 11.6% and 8.0%, respectively. Compared to those of 33.3% and 4.1% in the method for acquiring the pronunciation of <OOV> by use of a sub-word sequence shown in FIG. 3, the balance of both rates is improved, that is, the difference between both rates is decreased.

FIG. 19 shows the result of an experiment in which one person output an utterance including <OOV>"KUROSAKI" and an utterance including <OOV>"KAZUMI", and the <OOV> was acquired from the utterances.

As shown in FIG. 19, in a first recognition, "KUROSAKI" was recognized as "KUROTACHI", where substitution errors occurred in "TA" and "CHI". In a second recognition, "KUROSAKI" was recognized as "OROSA", where a deletion error of "KU" and substitution error to "O" occurred. In a third recognition, "KUROSAKI" was recognized as "ROSAKI", where a deletion error of "KU" occurred. In a fourth recognition, "KUROSAKI" was recognized as "ROSAKI", where a deletion error of "KU" occurred. Finally, in a fifth recognition, "KUROSAKI" was recognized as "KUROSAKI", that is, no error occurred.

"KAZUMI", in a first recognition, was recognized as "KAZUMI", where no error occurred. In a second recognition, "KAZUMI" was recognized as "KATSUNI", where substitution errors for "ZU" and "MI" occurred. In a third recognition, "KAZUMI" was recognized as "KAZUMI", where no error occurred. In a fourth recognition, "KAZUMI" was recognized as "KATSUMI", where a substitution error for "ZU" occurred. In a fifth recognition, "KAZUMI" was recognized as "KASUMI", where a substitution error for "ZU" occurred.

Referring back to FIG. 9, at step S29, the matching module 44 provides the control module 48 with the obtained pronunciation corresponding to <OOV> (pronunciation or reading of the unknown word) and feature parameters for the duration of the pronunciation. The process then proceeds to step S30.

At step 30, the control module 48 delivers the pronunciation and the feature parameters of the unknown word received from the matching module 44 to the word extracting unit 2 (see FIG. 5) and controls the word extracting unit 2 to execute a word extracting process for acquiring the unknown word.

Figure 20:
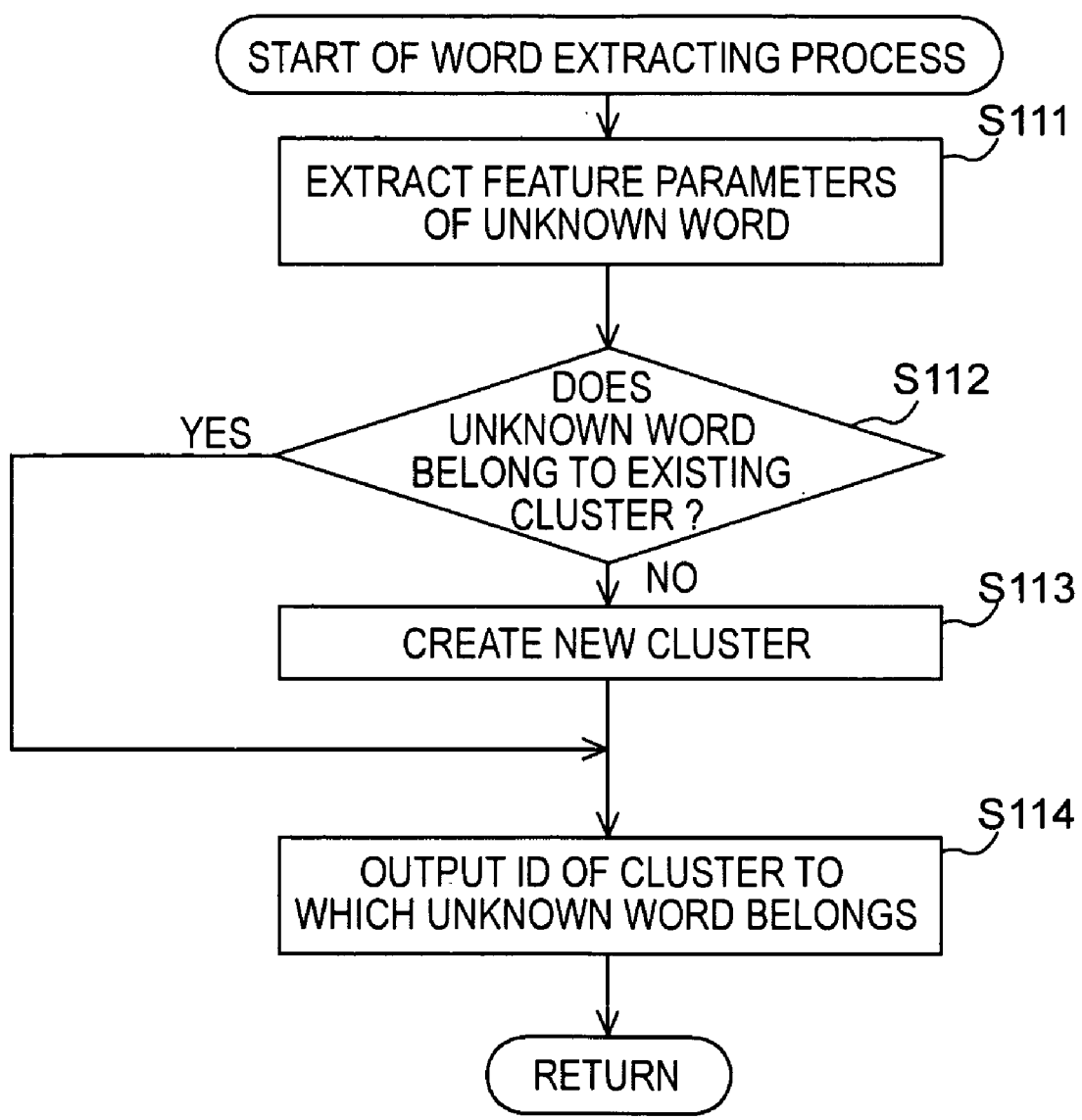
FIG. 20 is a flow chart illustrating the detailed word extracting process at step S28.

The word extracting process is described in detail with reference to FIG. 20. At step S111, the word extracting unit 2 extracts feature parameters of an unknown word (<OOV>) delivered from the speech recognition unit 1. At step S112, the word extracting unit 2 determines whether or not the unknown word belongs to existing clusters on the basis of the feature parameters of the unknown word. If it is determined at step S112 that the unknown word does not belong to the existing clusters, the word extracting unit 2, at step S113, creates a new cluster corresponding to the unknown word and assigns a unique cluster ID to the cluster. Then, at step S114, the word extracting unit 2 outputs the ID of the cluster, to which the unknown word belongs, to the control module 48 of the speech recognition unit 1.

If it is determined at step S112 that the unknown word belongs to one of the existing clusters, the word extracting unit 2 need not create a new cluster, and therefore the word extracting unit 4 skips the process at step S113. The process proceeds to step S114, where the word extracting unit 2 outputs the ID of the existing cluster, to which the unknown word belongs, to the control module 48 of the speech recognition unit 1. The control module 48 delivers the cluster ID of the unknown word output from the word extracting unit 2 to the dialog control unit 4 along with the pronunciation of the unknown word and the speech recognition result including the unknown word.

Referring back to FIG. 9, after the word extracting process at step S30 is completed, the dialog control unit 4, at step S31, determines whether or not a word sequence of the speech recognition result delivered from the control module 48 matches a template. In other words, at this step, it is determined whether or not the recognized word sequence requires registering some name. Subsequently, if it is determined at step S31 that the recognized word sequence matches the template, the process proceeds to step S32, where the dialog control unit 4 controls the associative memory unit 3 to store the cluster ID and its category received from the control module 48.

An example of the template used for the dialog control unit 4 at step S31 is described with reference to FIG. 21. In FIG. 21, "/A/" means "if a word sequence A is included" and "A|B" means either A or B. "." means any single character and "A+" means one or more repetitions of A. "(.)+" means any character sequence.

A template 121 shown in FIG. 21 indicates that, if the recognized word sequence matches the regular expression in the left column in the drawing, the corresponding operation in the right column is performed. For example, if the recognized word sequence is "<start>/WATASHI/NO/NAMAE/WA/<OOV> (O/GA/WA)/DESU/<end>", the character sequence generated from this speech recognition result "WATASHINONAMAEWA<OOV>" matches the second regular expression in FIG. 21. Consequently, the corresponding operation "Register cluster ID corresponding to <OOV> as a user name" is performed. That is, if a cluster ID of "<OOV> (O/GA/WA)" is "1", as shown in FIG. 7, the category name for the cluster ID "1" is registered as "user name".

Additionally, for example, if the recognized word sequence is "<start>/KIMI/NO/NAMAE/WA/<OOV> (A/I/BO)/DAYO/<end>", "KIMINONAMAEWA<OOV>" in the recognized word sequence matches the first regular expression in FIG. 21. Consequently, if a cluster ID of "<OOV> (A/I/BO)" is "2", the category name for the cluster ID "2" is registered as "robot name".

Some dialog systems have only one type of registered words (for example, only "user name"). In this case, the template 121 and the associative memory unit 3 can be simplified. For example, the template 121 contains the operation "if a speech recognition result includes <OOV>, then the ID of <OOV> is stored" and the associative memory unit 3 stores only the cluster ID.

Thus, the dialog control unit 4 utilizes the above-described information registered in the associative memory unit 3 to carry out a determination process in the subsequent dialog. For example, when the dialog system carries out the following processes:

determining whether or not an utterance from a user contains a robot name;

determining that the dialog system is called from the user if the utterance contains a robot name; and sending back an appropriate reply if the robot name is contained, or when the dialog system carries out the following process: allowing the robot to speak the user name, the dialog control unit 4 can acquire a word for the robot name (an entry whose category name is "robot name") or a word for the user name (an entry whose category name is "user name") by referencing the information in the associative memory unit 3.

On the other hand, if it is determined at step S23 in FIG. 9 that the speech recognition result does not contain an unknown word, or if it is determined at step S25 that the speech recognition result is rejected, or if it is determined at step S31 that the speech recognition result does not match the template, the process proceeds to step S33, where the dialog control unit 4 generates a reply for the input utterance. That is, a name (unknown word) is not registered and a predetermined process for the input utterance from the user is performed.

More specifically, if it is determined at step S23 that the speech recognition result does not contain an unknown word, that is, if the speech recognition result contains only known words, the control module 48 of the speech recognition unit 1 delivers the speech recognition result containing only known words to the dialog control unit 4. The dialog control unit 4 generates, for example, a reply sentence to the speech recognition result containing only known words and outputs the reply sentence using synthetic sound.

Additionally, if it is determined at step S25 that the speech recognition result is rejected, that is, if it is determined that the speech recognition result contains an unknown word and the duration of the unknown word is considered to have been erroneously estimated, the control module 48 of the speech recognition unit 1 delivers that event. In this case, the dialog control unit 4, for example, generates a prompt message asking the user to make an utterance again and outputs the prompt message using synthetic sound.

Furthermore, if it is determined at step S31 that the speech recognition result does not match the template, that is, if the dialog system shown in FIG. 5 does not define a response (i.e., action) to the speech recognition result containing the unknown word, the dialog control unit 4 generates, for example, a message indicating that the dialog system cannot understand the user utterance and outputs the message using synthetic sound.

As described above, when the speech recognition result contains an unknown word and when it is estimated that the duration of the unknown word (<OOV>) is erroneous, the speech recognition result is rejected. Consequently, the acquisition of an erroneous unknown word can be prevented.

When, at step S32, the dialog control unit 4 causes the associative memory unit 3 to memorize the cluster ID of a name, which is an unknown word, in association with its category, the control module 48 of the speech recognition unit 1 can register the pronunciation of the name (i.e., unknown word) into the dictionary database 52. Thus, after the registration, the speech recognition unit 1 can recognize the previously unknown word as a known word.

Additionally, the processes at steps S24 and S25 in FIG. 9 may be executed immediately after the process at step S28 (immediately before the process at step S29). That is, if it is determined at step S23 that the speech recognition result contains an unknown word, the process may directly proceed to step S26. Also, after selecting a sentence hypnosis at step S28, it may be determined at steps S24 and S25 whether the sentence hypnosis is rejected or not in the above-described manner. If it is determined that the sentence hypnosis is rejected, the process may proceed to step S33. If it is determined that the sentence hypnosis is not rejected, the process may proceed to step S29.

When a grammar is used as a language model in the speech recognition process at step S22 shown in FIG. 9, the grammar may include a description corresponding to the function of the phonetic typewriter 45. FIG. 22 illustrates an example of the grammar in this case. In a grammar 131 shown in FIG. 22, a variable "$SYLLABLE" in the first line contains all the syllables concatenated with "|", which means "or". Therefore, $SYLLABLE represents one of the syllable symbols. This function corresponds to the phonetic typewriter 45. A variable "$OOV" represents zero or more repetitions of "$SYLLABLE". Consequently, "$OOV" between "WA" and "DESU" in the third line can accept any pronunciation.

In the speech recognition result using the grammar 131, the portion corresponding to "$OOV" is written using symbols representing one or more syllables. For example, the speech recognition result of "WATASHINONAMA-EWAOGAWADESU" (where "OGAWA" is an unknown word) is "<start>/WATASHI/NO/NAMAE/WA/O/GA/WA/DESU/<end>".

In the foregoing description, a category is registered as information about an unknown word by the associative memory unit 3; however, other information may be registered. Additionally, step S30 of the flow chart in FIG. 9 may be eliminated. In this case, the dialog control unit 4, at step S32, controls the associative memory unit 3 to memorize a sub-word sequence (the pronunciation of the unknown word) in association with its corresponding category.

Furthermore, in the foregoing description, the network generating module 47 generates a word/syllable network from words and syllables, as shown in FIG. 17C; however, the network generating module 47 can generate a different network from words and sub-words other than syllables, such as phonemes and other phonological units.

Figure 23:
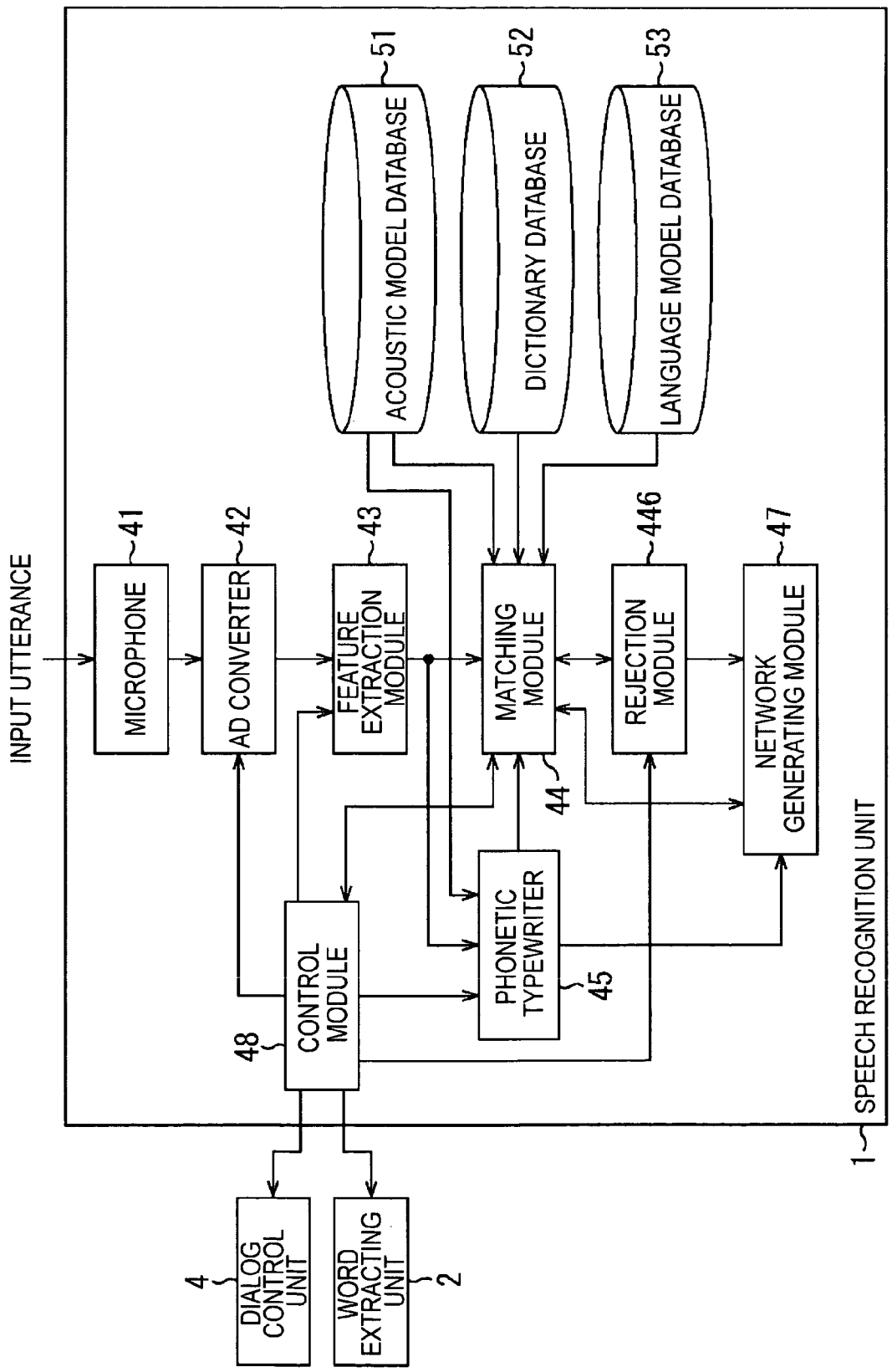
FIG. 23 is a block diagram illustrating another configuration of the speech recognition unit 1.

FIG. 23 illustrates another configuration of the speech recognition unit 1 shown in FIG. 5. In FIG. 23, identical elements to those illustrated and described in relation to FIG. 8 are designated by identical reference numerals, and therefore, the descriptions are not repeated. That is, the speech recognition unit 1 shown in FIG. 23 is identical to that shown in FIG. 8 except that the speech recognition unit 1 in FIG. 23 does not include the OOV-check language model database 54 and includes a rejection module 346 in place of the rejection module 46.

The rejection module 346 computes a confidence measure for a speech recognition result delivered from the matching module 44. The rejection module 346 then determines whether to reject the speech recognition result on the basis of the confidence measure.

As shown in FIG. 23, in the speech recognition unit 1 having such a configuration, it is determined at step S25 in FIG. 9 whether a speech recognition result, from the matching module 44, containing an unknown word is rejected or not as follows:

That is, the rejection module 346 computes the confidence measures for known words adjacent to the unknown word in the speech recognition result containing the unknown word from the matching module 44. In other words, the rejection module 346 computes confidence measures for a word immediately before the unknown word and for a word immediately after the unknown word. Here, the confidence measure indicates the confidence (credibility) of the identity of a word with respect to a speech recognition result. The computing method of the confidence measure is described later.

The rejection module 346 determines to adopt a speech recognition result if, for example, a confidence measure for a word immediately before an unknown word (<OOV>) and a confidence measure for a word immediately after the unknown word are greater than or equal to (or simply greater than) a predetermined threshold value. Also, the rejection module 346 determines to reject a speech recognition result if, for example, either a confidence measure for a word immediately before an unknown word (<OOV>) or a confidence measure for a word immediately after the unknown word is smaller than (or equal to) the predetermined threshold value.

Alternatively, for example, the rejection module 346 can determine whether to reject a speech recognition result on the basis of a magnitude relation between an average value of the confidence measures for a word immediately before an unknown word in the speech recognition result and a confidence measure for a word immediately after the unknown word and a predetermined threshold value. Additionally, the rejection module 346 can determine whether to reject a speech recognition result on the basis of a magnitude relation between one of the confidence measures for a word immediately before an unknown word in the speech recognition result and a confidence measure for a word immediately after the unknown word and a predetermined threshold value. Furthermore, the rejection module 346 can determine whether to reject a speech recognition result on the basis of a magnitude relation between the confidence measures for two or more words immediately before an unknown word in the speech recognition result and the confidence measures for two or more words immediately after the unknown word and a predetermined threshold value.

In the case where the finite state automaton (FSA) shown in FIG. 16 is used as the OOV-check language model and it is determined whether or not a speech recognition result is rejected on the basis of the OOV-check language model, if a speech recognition result is not accepted by the FSA serving as the OOV-check language model, the speech recognition result is rejected. Accordingly, although an utterance which a user outputs to register his or her own name (i.e., unknown word) is restricted by the FSA, a speech recognition result that likely includes the misestimated duration of an unknown word can be exactly rejected.

In contrast, in the case where a statistical language model is used as the OOV-check language model and it is determined whether or not a speech recognition result is rejected on the basis of the OOV-check language model or in the case where it is determined whether or not a speech recognition result is rejected on the basis of the confidence measure of a speech recognition result, a speech recognition result that likely includes the misestimated duration of an unknown word may be accepted. However, a user can make the utterance with few restrictions when the user registers his or her own name, namely, an unknown word.

Additionally, to determine whether a speech recognition result is rejected or not, the above-described methods may be combined. That is, a finite state automaton (FSA) is used as the OOV-check language model and it is determined whether or not a speech recognition result is rejected on the basis of the OOV-check language model. If it is determined that the speech recognition result is adopted, it can be further determined whether or not the adopted speech recognition result is rejected on the basis of the confidence measure of the speech recognition result.

As described above, the rejection module 346 shown in FIG. 23 determines whether or not the speech recognition result (the word in the speech recognition result) is rejected on the basis of the confidence measure of the speech recognition result. A method for computing the confidence measure is described next.

The confidence measure indicates the degree of the confidence (credibility) of a speech recognition result (a word in the speech recognition result). Accordingly, in a speech recognition result containing an unknown word, if the confidence measures of known words adjacent to the unknown word (i.e., a word immediately before the unknown word and a word immediately after the unknown word) are at a certain level, the probability of the known words being some known words is also at a certain level with respect to the speech recognition result. Therefore, it is probable that the duration between the known words is an unknown word (the duration of the unknown word). In contrast, if the confidence measures of the known words adjacent to the unknown word are low, the probability of the known words being some known words is also low with respect to the speech recognition result. Therefore, it is not probable that the duration between the known words is an unknown word (the duration of the unknown word).

Thus, in the rejection module 346 shown in FIG. 23, by rejecting a speech recognition result on the basis of the confidence measures of the known words adjacent to an unknown word, a speech recognition result that likely includes the misestimated duration of the unknown word can be rejected, thus preventing the acquisition of an erroneous unknown word.

For example, when the matching module 44 performs a speech recognition process using an HMM, the rejection module 346 computes a confidence measure as follows:

That is, in general, in a speech recognition process using an HMM acoustic model, a word model is represented as a concatenation of phonemes and syllables, which are fundamental recognition units, in the HMM. During the speech recognition, a recognition error (erroneous recognition) may be caused by an input utterance not being exactly separated into phoneme units and syllable units. Conversely speaking, if boundaries (positions) between, for example, phoneme units in the input utterance can be exactly determined, the phonemes can be exactly recognized, and therefore, the words and sentences can be exactly recognized.

To determine whether an input audio signal is exactly divided into phoneme units having exact boundaries in a speech recognition result, the phoneme boundary verification measure PBVM is introduced as a verification scale. The phoneme boundary verification measure PBVM is computed for each phoneme in the speech recognition result (word sequence). The phoneme boundary verification measure PBVM for each phoneme is expanded for a word unit or a sentence unit to obtain a confidence measure for the word or sentence. Accordingly, the confidence measure can be computed for both a word and a sentence (entire speech recognition result).

For example, the phoneme boundary verification measure PBVM is computed as follows:

That is, a phoneme boundary k is defined as a boundary between any phoneme k and the next phoneme k+1 in a speech recognition result (a word sequence). Contexts at the left and right of the phoneme boundary k (temporally before and after the phoneme boundary k) are then defined. To define the two contexts at the left and right of (before and after) the phoneme boundary k, one of the three definitions shown in FIGS. 24, 25, and 26 can be adopted.

Figure 24:
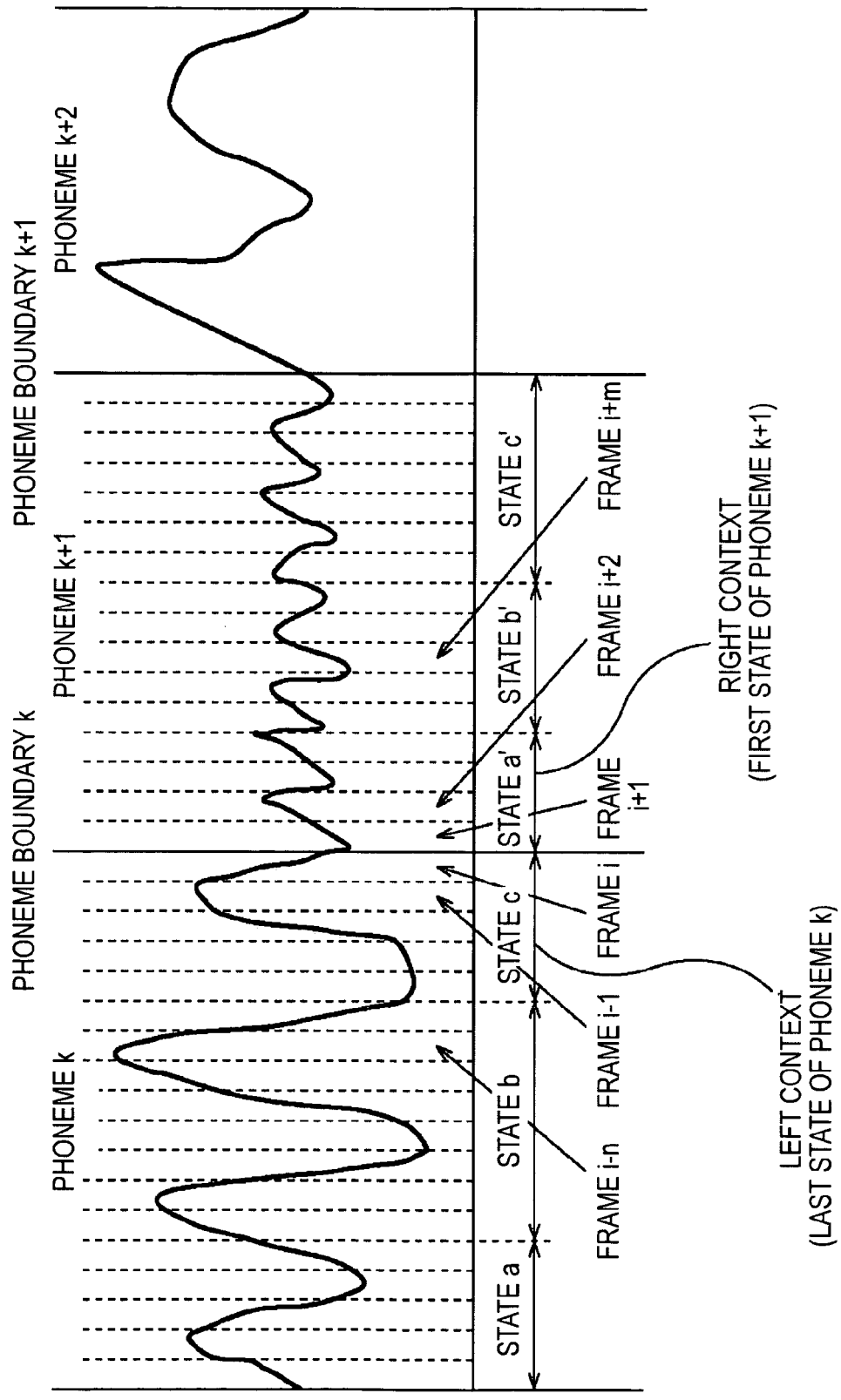
FIG. 24 is a diagram illustrating a definition for two contexts at the left and right of a phoneme boundary k.

That is, FIG. 24 illustrates an example of the first definition for the two contexts at the left and right of (before and after) the phoneme boundary k.

In FIG. 24, the phonemes k, k+1, a phoneme k+2, a phoneme boundary k, which is a boundary between the phonemes k and k+1, and a phoneme boundary k+1, which is a boundary between the phonemes k+1 and k+2, are shown. In the phonemes k and k+1, a boundary between frames of the audio signal is shown by a dotted line. For example, the last frame of the phoneme k is a frame i, and the first frame of the phoneme k+1 is a frame i+1. Furthermore, in the phoneme k, an HMM state (the state of the HMM) is sequentially shifted to states a, b, and C, whereas, in the phoneme k+1, an HMM state (the state of the HMM) is sequentially shifted to states a', b', and C'.

A solid curve in FIG. 24 (and in FIGS. 25 and 26 described below) represents, for example, a transition of the power of the audio signal.

In the first definition for the two contexts at the left and right of (before and after) the phoneme boundary k, as shown in FIG. 24, the context at the left of the phoneme boundary k (before the phoneme boundary k in a time sequence) includes all of the frames corresponding to the state c, which is the last HMM state of the phoneme k, namely, frames between the frame (i−4) and the frame i. The context at the right of the phoneme boundary k (after the phoneme boundary k in a time sequence) includes all of the frames corresponding to the state a', which is the first HMM state of the phoneme k+1, namely, frames between the frame (i+1) and the frame (i+4).

Figure 25:
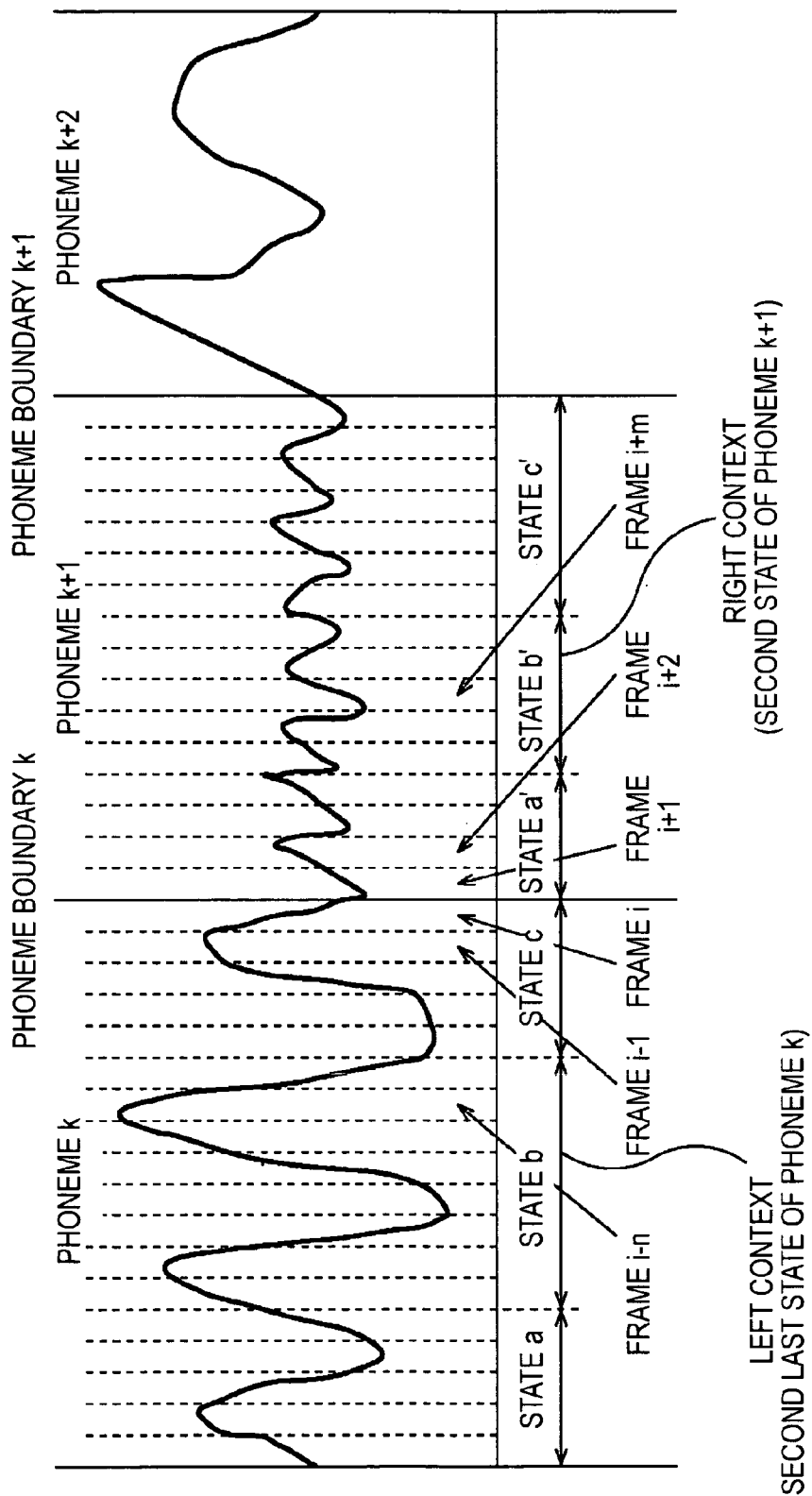
FIG. 25 is a diagram illustrating a definition for two contexts at the left and right of a phoneme boundary k.

FIG. 25 illustrates an example of the second definition for the two contexts at the left and right of (before and after) the phoneme boundary k. In FIG. 25, identical elements to those illustrated and described in relation to FIG. 24 are designated by identical reference numerals, and therefore, the descriptions are not repeated (the same in FIG. 26 described below).

In the second definition for the two contexts at the left and right of (before and after) the phoneme boundary k, as shown in FIG. 25, the context at the left of the phoneme boundary k includes all of the frames corresponding to the state b, which is the second last HMM state of the phoneme k. The context at the right of the phoneme boundary k includes all of the frames corresponding to the state b', which is the second HMM state of the phoneme k+1.

Figure 26:
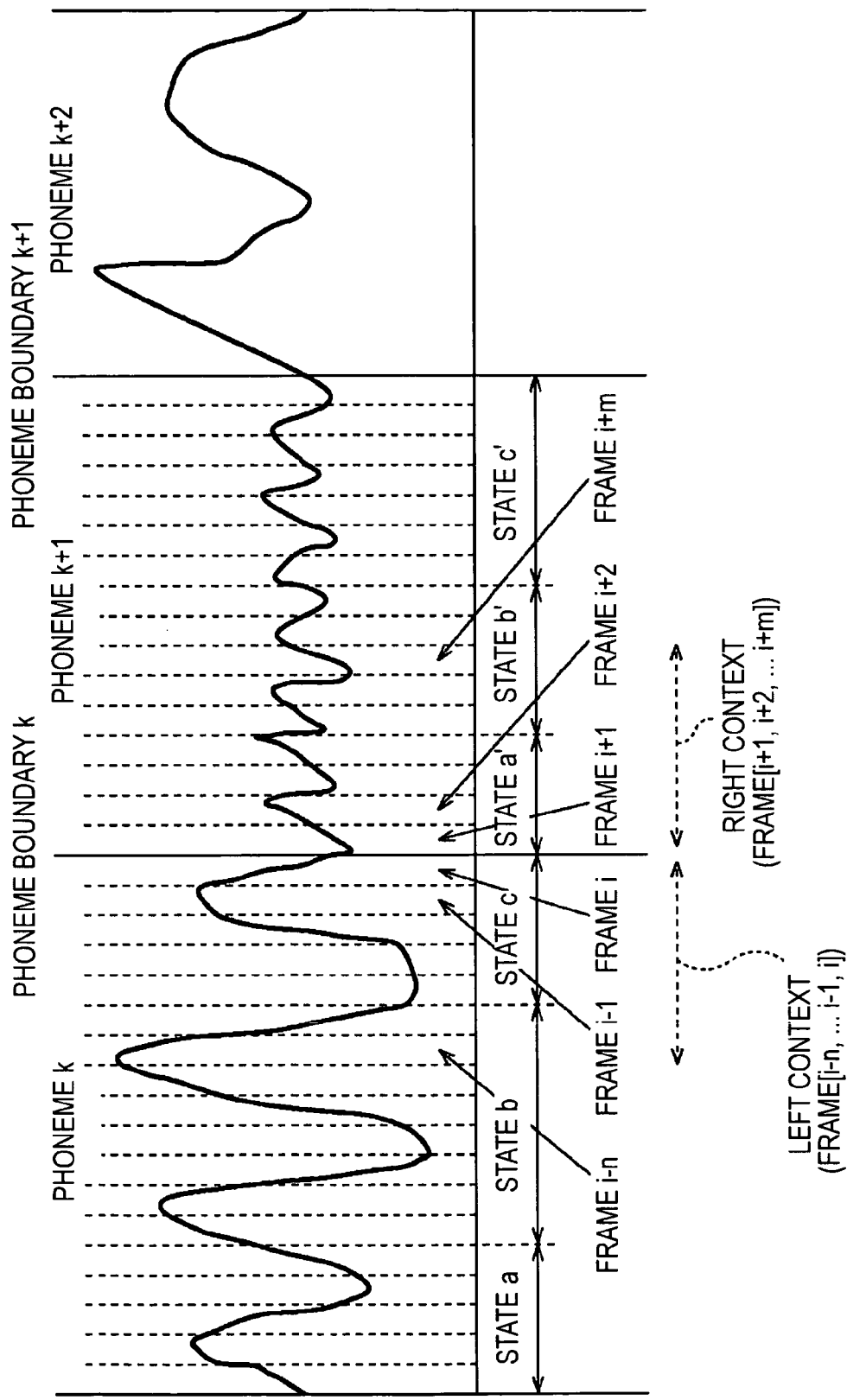
FIG. 26 is a diagram illustrating a definition for two contexts at the left and right of a phoneme boundary k.

FIG. 26 illustrates an example of the third definition for the two contexts at the left and right of (before and after) the phoneme boundary k.

In the third definition for the two contexts at the left and right of (before and after) the phoneme boundary k, as shown in FIG. 26, the context at left of the phoneme boundary k includes the frames (i−n) through i. A context at the right of the phoneme boundary k includes the frames (i+1) through (i+m). Here, n and m are integers greater than or equal to 1.

Subsequently, a similarity function that indicates the similarity of the two contexts is computed. To compute the similarity function, a vector representing a context is introduced.

For example, to perform speech recognition (matching), a spectrum is extracted on a frame basis. In this case, for example, a vector that includes the coefficients of the spectrum is generated for each frame of the context. The vector of a context (i.e., a vector indicating the context) may be an average of the vectors for all of the frames in the context.

Let the vectors for the two contexts be x and y. The similarity function s(x, y) is given, for example, by the following equation (1):

$$s(x, y) = \frac{x^t y}{\|x\| \cdot \|y\|} \quad (1)$$

In equation (1), $\|x\|$ is a norm in a vector space of the vector x (similar for $\|y\|$), $x^t$ is the transpose of the vector x. Since the similarity function s(x, y) in equation (1) is computed by dividing the inner product $x^t y$ of the vectors x and y by a product $\|x\| \cdot \|y\|$ of the magnitudes of vectors x and y, the similarity function s(x, y) is an angle (cos θ) between the two vectors x and y.

Here, as the value of the similarity function s(x, y) decreases, the similarity of the vectors x and y increases.

By using the similarity function s(x, y), the phoneme boundary verification measure PBVM(k) for a given phoneme boundary k can be expressed by the following equation (2):

$$PBVM(k) = \frac{1 - s(x, y)}{2} \quad (2)$$

In addition to the similarity function s(x, y), to compute the similarity of two vectors x and y, a distance function d(x, y), which represents a distance between two vectors x and y, may be adopted (note that d(x, y) is normalized in the range from −1 to 1). In this case, the phoneme boundary verification measure PBVM(k) can be expressed by the following equation (3):

$$PBVM(k) = \frac{1 - d(x, y)}{2} \quad (3)$$

A vector that indicates a spectrum of each frame included in the context (a vector that includes the coefficients of the spectrum) is generated and an average of the vectors for all of the frames in the context (average vector) is used as both the vectors x and y for the contexts at the phoneme boundary k. In addition, for example, a vector representing a spectrum of the frame closest to the phoneme boundary k has an average value of vectors representing spectrums for all of the frames in the context subtracted from it. The resultant vector may be adopted as both the vectors x and y. Additionally, when the output probability density function of features in the HMM is represented using a Gauss distribution, the vectors x and y for the contexts at the phoneme boundary k can be computed from, for example, an average vector defining the Gauss distribution representing the output probability density function in an HMM state corresponding to frames in the context.

The phoneme boundary verification measure PBVM(k) for a given phoneme boundary k obtained by equation (2) or (3) is a continuous function having a value between 0 and 1 with respect to a variable k. "PBVM(k)=0" indicates that vectors for contexts at the left and right of the phoneme boundary k are oriented in the same direction. That is, when the function value of the phoneme boundary verification measure PBVM (k) is 0, the phoneme boundary k does not coincide with the actual phoneme boundary, that is, a recognition error may occur.

In contrast, when the function value of the phoneme boundary verification measure PBVM(k) is 1, vectors for contexts at the left and right of the phoneme boundary k are oriented in opposite directions, and therefore, the phoneme boundary k possibly coincides with the exact phoneme boundary in the audio signal.

As described above, the phoneme boundary verification measure PBVM(k) having the range between 0 and 1 indicates the likelihood of the phoneme boundary k being the actual phoneme boundary.

Subsequently, since each word in a word sequence of the speech recognition result includes a plurality of phonemes, the confidence measure of the word can be computed from the phoneme boundary verification measure PBVM(k) for the phonemes of the word.

That is, the following value can be adopted as the confidence measure of a word: the average value of the phoneme boundary verification measure PBVM for each phoneme of the word; the minimum value of the phoneme boundary verification measure PBVM for each phoneme of the word; the difference between the maximum value and the minimum value of the phoneme boundary verification measure PBVM for each phoneme of the word; the standard deviation of the phoneme boundary verification measure PBVM for each phoneme of the word; or the variation coefficient (a value computed by dividing the standard deviation by the average value) of the phoneme boundary verification measure PBVM for each phoneme of the word.

The total confidence measure of the word sequence of the speech recognition result can be obtained in the same manner as the confidence measure of the word.

That is, when the speech recognition result is, for example, "The weather yesterday was nice" and the confidence measures for the words "The", "weather", "yesterday", "was", and "nice" are 0.90, 0.86, 0.13, 0.81, and 0.95, respectively, and when the minimum value among the confidence measures for the words in the word sequence, for example, is adopted as a confidence measure for the speech recognition result, the confidence measure for the speech recognition result "The weather yesterday was nice" is 0.13, which is the value of the confidence measure for the word "yesterday". Alternatively, when the average value among the confidence measures for the words in the word sequence of the speech recognition result is adopted as a confidence measure for the speech recognition result, the confidence measure for the speech recognition result "The weather yesterday was nice" is 0.73, which is the average value of the confidence measures 0.90, 0.86, 0.13, 0.81, and 0.95 for the respective words "The", "weather", "yesterday", "was", and "nice".

In the above-described cases, the confidence measure for a speech recognition result is obtained from the confidence measure for each word in a word sequence of the speech recognition result. In addition to that, the confidence measure for a speech recognition result can be directly obtained from, for example, the phoneme boundary verification measure PBVM for each phoneme boundary of the word in a word sequence of the speech recognition result.

Additionally, as disclosed in Japanese Unexamined Patent Application Publication No. 9-259226, the difference between confidence score values of a candidate of a speech recognition result in first place and in second place can be adopted as the confidence measure. Furthermore, the confidence measure can be computed from an acoustic score for each frame computed from an HMM. Still furthermore, the confidence measure can be computed using a neural network.

The above-described processes can be executed by either hardware or software. When the processes are executed by software, a program for the software is installed, from a word/syllable network or a recording medium, in a computer including dedicated hardware or a general-purpose personal computer capable of executing a variety of functions by installing a variety of programs.

As shown in FIG. 27, examples of the recoding medium include not only a package medium distributed to users to provide the users with the program separately from the apparatus, such as a magnetic disk 171, an optical disk 172, a magneto-optical disk 173, and a semiconductor memory 174, but also a ROM (read only memory) 152 storing the program and a hard disk included in a storage unit 158 which are pre-stored in the apparatus and which are distributed to the users with the apparatus.

FIG. 27 illustrates the configuration of a personal computer 150 for executing the processes of the dialog system shown in FIG. 5 by software. The personal computer 150 includes a CPU (central processing unit) 151. An input and output (I/O) interface 155 is connected to the CPU 151 via a bus 154. The ROM 152 and a RAM (random access memory) 153 are connected to the bus 154.

A mouse, a keyboard, and a microphone, which are operated by a user, an input unit 157 including an input device, such as an AD converter, and an output unit 156 including an output unit, such as a display, a speaker, and a DA converter, are connected to the I/O interface 155. Additionally, the storage unit 158 including a hard disk drive for storing programs and a variety of data and a communication unit 159 for sending and receiving data via a word/syllable network, such as the Internet, are connected to the I/O interface 155.

An optional drive 160 is connected to the I/O interface 155. The drive 160 reads data from and writes data on a recording medium, such as the magnetic disk 171, the optical disk 172, the magneto-optical disk 173, and the semiconductor memory 174.

A speech processing program that allows the personal computer 150 to execute the function of a speech processing apparatus to which the embodiment of the present invention is applied is stored in the magnetic disk 171 including a flexible disk, the optical disk 172 including a CD-ROM (compact disc-read only memory) and a DVD (digital versatile disc), the magneto-optical disk 173 including an MD (mini disc), or the semiconductor memory 174. The recording medium including the speech processing program is provided to the personal computer 150, in which the speech processing program is read out by the drive 160 and is installed in a hard disk drive included in the storage unit 158. The speech processing program installed in the storage unit 158 is loaded from the storage unit 158 to the RAM 153 in response to a command from the CPU 151 corresponding to a user command input via the input unit 157.

In the present specification, the steps that describe the program stored in the recording media include not only processes executed in the above-described sequence, but also processes that may be executed in parallel or independently.

In addition, as used in the present specification, "system" refers to a logical combination of a plurality of devices; the plurality of devices are not necessarily included in one body.

It should be understood by those skilled in the art that various modifications, combinations, sub-combinations and alterations may occur depending on design requirements and other factors insofar as they are within the scope of the appended claims or the equivalents thereof.

What is claimed is:

1. A speech processing apparatus for processing an input utterance and registering an unknown word contained in the input utterance into a dictionary database on the basis of the processing result, comprising:

recognition means for recognizing the input utterance;

unknown word determination means for determining whether the recognition result of the input utterance obtained by the recognition means contains an unknown word on the basis of an acoustic model representing acoustic features of individual phonemes and syllables of a language;

recognition result rejection means for determining whether the recognition result determined by the unknown word determination means to contain an unknown word is rejected or not for acquisition and for registering into the dictionary database; and word extracting means for registering and for acquiring pronunciation of a word corresponding to the unknown word contained in the recognition result determined not to be rejected by the recognition result rejection means, wherein the acquired pronunciation of the word is used for subsequent speech recognition, wherein the recognition result rejection means determines whether the recognition result is rejected or not on the basis of a confidence measure for a known word immediately before the unknown word and a confidence measure for a known word immediately after the unknown word contained in the recognition result.

2. The speech processing apparatus according to claim 1, wherein the recognition result rejection means determines whether the recognition result is rejected or not on the basis of an unknown-word language model for a sentence containing an unknown word.

3. The speech processing apparatus according to claim 2, wherein the unknown-word language model is a grammar model written with a finite state automaton.

4. The speech processing apparatus according to claim 2, wherein the unknown-word language model is a statistical language model.

5. The speech processing apparatus according to claim 1, wherein the recognition means recognizing the input utterance based on at least feature parameters which include spectrum, power linear predictive coefficients, spectrum coefficients and a line spectrum pair.

6. A speech processing method for processing an input utterance and registering an unknown word contained in the input utterance into a dictionary database on the basis of the processing result, comprising the steps of:

(a) recognizing, utilizing a recognition unit, the input utterance;

(b) determining, utilizing an unknown word determination unit, whether the recognition result of the input utterance obtained by step (a) contains an unknown word on the basis of an acoustic model representing acoustic features of individual phonemes and syllables of a language;

(c) determining, utilizing a recognition result rejection unit, whether the recognition result determined at step (b) to contain an unknown word is rejected or not for acquisition and for registering into the dictionary database; and (d) registering and acquiring, utilizing a word extracting unit, pronunciation of a word corresponding to the unknown word contained in the recognition result determined not to be rejected by step (c), wherein the acquired pronunciation of the word is used for subsequent speech recognition, and wherein the recognition result rejection unit determines whether the recognition result is rejected or not on the basis of a confidence measure for a known word immediately before the unknown word and a confidence measure for a known word immediately after the unknown word contained in the recognition result.

7. A computer-readable recording medium storing a program, the program processing an input utterance and registering an unknown word contained in the input utterance into a dictionary database on the basis of the processing result, the program including the steps of:

(a) recognizing the input utterance;

(b) determining whether the recognition result of the input utterance obtained by step (a) contains an unknown word on the basis of an acoustic model representing acoustic features of individual phonemes and syllables of a language;

(c) determining whether the recognition result determined at step (b) to contain an unknown word is rejected or not for acquisition and registering into the dictionary database; and (d) registering and acquiring pronunciation of a word corresponding to the unknown word contained in the recognition result determined not to be rejected by step (c), wherein the acquired pronunciation of the word is used for subsequent speech recognition, and wherein the recognition result is determined to be rejected or not on the basis of a confidence measure for a known word immediately before the unknown word and a confidence measure for a known word immediately after the unknown word contained in the recognition result.

8. A speech processing apparatus for processing input utterance and registering an unknown word contained in the input utterance into a database on the basis of the processing result, comprising:

a recognition unit configured to recognize the input utterance;

an unknown word determination unit configured to determine whether the recognition result of the input utterance obtained by the recognition unit contains an unknown word on the basis of an acoustic model representing acoustic features of individual phonemes and syllables of a language;

a recognition result rejection unit configured to determine whether the recognition result determined by the unknown word determination unit to contain an unknown word is rejected or not for acquisition and for registering into the database; and a word extracting unit configured to register and to acquire pronunciation of a word corresponding to the unknown word contained in the recognition result determined not to be rejected by the recognition result rejection unit, wherein the acquired pronunciation of the word is used for subsequent speech recognition, and wherein the recognition result rejection unit determines whether the recognition result is rejected or not on the basis of a confidence measure for a known word immediately before the unknown word and a confidence measure for a known word immediately after the unknown word contained in the recognition result.

9. A speech processing apparatus for processing an input utterance and registering an unknown word contained in the input utterance into a database on the basis of the processing result, comprising:

recognition means for recognizing the input utterance based on both an acoustic score matching a duration of the input utterance for a known word and an acoustic score for a duration of the utterance for an unknown word;

unknown word determination means for determining whether the recognition result of the input utterance obtained by the recognition means contains the unknown word on the basis of an acoustic model representing acoustic features of individual phonemes and syllables of a language;

recognition result rejection means for determining whether the recognition result determined by the unknown word determination means to contain an unknown word is rejected or not for acquisition and for registering into the database; and word extracting means for storing pronunciation of a word corresponding to the unknown word contained in the recognition result determined not to be rejected by the recognition result rejection means, wherein the acquired pronunciation of the word is used for subsequent speech recognition, and wherein the recognition result rejection means determines whether the recognition result is rejected or not on the basis of a confidence measure for a known word immediately before the unknown word and for a known word immediately after the unknown word contained in the recognition result.

10. The speech processing apparatus according to claim 9, wherein the recognition result rejection means determines whether the recognition result is rejected or not on the basis of an unknown-word language model for a sentence containing an unknown word.

11. The speech processing apparatus according to claim 10, wherein the unknown-word language model is a grammar model written with a finite state automaton.

12. The speech processing apparatus according to claim 10, wherein the unknown-word language model is a statistical language model.

13. The speech processing apparatus according to claim 9, wherein matching against known words is performed word by word and matching for the unknown word is performed syllable by syllable.

14. A speech processing method for processing an input utterance and registering an unknown word contained in the input utterance into a database on the basis of the processing result, comprising the steps of:

(a) recognizing, utilizing a recognition unit, the input utterance based on an acoustic score matching a duration of the input utterance for a known word and an acoustic score for a duration of the utterance for an unknown word;

(b) determining, utilizing an unknown word determination unit, whether the recognition result of the input utterance obtained by step (a) contains an unknown word on the basis of an acoustic model representing acoustic features of individual phonemes and syllables of a language;

(c) determining, utilizing a recognition result rejection unit, whether the recognition result determined at step (b) to contain an unknown word is rejected or not for acquisition and for registering into the database; and (d) storing, utilizing a word extracting unit, pronunciation of a word corresponding to the unknown word contained in the recognition result determined not to be rejected by step (c), wherein the acquired pronunciation of the word is used for subsequent speech recognition, and wherein the recognition result rejection unit determines whether the recognition result is rejected or not on the basis of a confidence measure for a known word immediately before the unknown word and a confidence measure for a known word immediately after the unknown word contained in the recognition result.

15. A computer-readable recording medium storing a program, the program processing an input utterance and registering an unknown word contained in the input utterance into a database on the basis of the processing result, the program including the steps of:

(a) recognizing the input utterance based on an acoustic score matching a duration of the input utterance for a known word and an acoustic score for a duration of the utterance for an unknown word;

(b) determining whether the recognition result of the input utterance obtained by step (a) contains an unknown word on the basis of an acoustic model representing acoustic features of individual phonemes and syllables of a language;

(c) determining whether the recognition result determined at step (b) to contain an unknown word is rejected or not for acquisition and for registering into the database; and (d) storing pronunciation of a word corresponding to the unknown word contained in the recognition result determined not to be rejected by step (c), wherein the acquired pronunciation of the word is used for subsequent speech recognition, and wherein the recognition result is determined to be rejected or not on the basis of a confidence measure for a known word immediately before the unknown word and a confidence measure for a known word immediately after the unknown word contained in the recognition result.

16. A speech processing apparatus for processing input utterance and registering an unknown word contained in the input utterance into a database on the basis of the processing result, comprising:

a recognition unit configured to recognize the input utterance based on an acoustic score matching a duration of the input utterance for a known word and an acoustic score for a duration of the utterance for an unknown word on the basis of an acoustic model representing acoustic features of individual phonemes and syllables of a language;

an unknown word determination unit configured to determine whether the recognition result of the input utterance obtained by the recognition unit contains an unknown word;

a recognition result rejection unit configured to determine whether the recognition result determined by the unknown word determination unit to contain an unknown word is rejected or not for acquisition and for registering into the database; and a word extracting unit configured to store pronunciation of a word corresponding to the unknown word contained in the recognition result determined not to be rejected by the recognition result rejection unit, wherein the acquired pronunciation of the word is used for subsequent speech recognition, and wherein the recognition result rejection unit determines whether the recognition result is rejected or not on the basis of a confidence measure for a known word immediately before the unknown word and a confidence measure for a known word immediately after the unknown word contained in the recognition result.

* * * * *

UNITED STATES PATENT AND TRADEMARK OFFICE
CERTIFICATE OF CORRECTION

| | | |
|---|---|---|
| PATENT NO. | : 7,657,430 B2 | Page 1 of 1 |
| APPLICATION NO. | : 11/185182 | |
| DATED | : February 2, 2010 | |
| INVENTOR(S) | : Hiroaki Ogawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this

Twenty-eighth Day of December, 2010

David J. Kappos
*Director of the United States Patent and Trademark Office*